United States Patent
Huang

(10) Patent No.: US 10,638,390 B2
(45) Date of Patent: Apr. 28, 2020

(54) TERMINAL HANDOVER METHOD, CONTROLLER, TERMINAL, BASE STATION, AND SYSTEM

(71) Applicant: Huawei Technologies Co., Ltd., Shenzhen (CN)

(72) Inventor: Yada Huang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 28 days.

(21) Appl. No.: 16/024,430

(22) Filed: Jun. 29, 2018

(65) Prior Publication Data
US 2018/0310214 A1    Oct. 25, 2018

Related U.S. Application Data

(63) Continuation of application No. PCT/CN2016/111507, filed on Dec. 22, 2016.

(30) Foreign Application Priority Data

Dec. 31, 2015  (CN) .......................... 2015 1 1029928

(51) Int. Cl.
*H04W 36/08* (2009.01)
*H04W 36/38* (2009.01)
(Continued)

(52) U.S. Cl.
CPC .......... *H04W 36/08* (2013.01); *H04W 24/10* (2013.01); *H04W 36/02* (2013.01); *H04W 36/30* (2013.01);
(Continued)

(58) Field of Classification Search
CPC ..... H04W 36/08; H04W 36/30; H04W 24/10; H04W 88/02; H04W 88/08; H04W 36/24; H04W 24/00; H04W 88/12
See application file for complete search history.

(56) References Cited

U.S. PATENT DOCUMENTS

| 10,015,687 | B2 * | 7/2018 | Van Lieshout | ....... H04W 24/08 |
| 2006/0116118 | A1 * | 6/2006 | Charriere | .............. H04W 36/30 455/423 |

(Continued)

FOREIGN PATENT DOCUMENTS

| CN | 101877895 A | 11/2010 |
| CN | 102469557 A | 5/2012 |

(Continued)

*Primary Examiner* — Kevin D Mew
(74) *Attorney, Agent, or Firm* — Slater Matsil, LLP

(57) ABSTRACT

In a terminal handover method, a controller sends a radio identifier and a control channel resource of a terminal that are configured by the controller to the terminal. When the terminal is located in a coverage area of a first base station, the controller sends the radio identifier and the control channel resource of the terminal to the first base station. The controller determines that the terminal is located in a coverage area of a second base station, and sends the radio identifier and the control channel resource of the terminal to the second base station. The terminal receives the control signalling sent from the first base station and the second base station separately by using the control channel resource.

20 Claims, 11 Drawing Sheets

A controller sends a radio identifier and a control channel resource of a terminal that are configured by the controller to the terminal — 201

When the terminal is located in a coverage area of a first base station, the controller sends the radio identifier and the control channel resource of the terminal to the first base station — 202

The controller determines that the terminal is located in a coverage area of a second base station, and the controller sends the radio identifier and the control channel resource of the terminal to the second base station, so that control signaling sent from the first base station and the second base station separately is received by the terminal by using the control channel resource — 203

(51) Int. Cl.
*H04W 36/02* (2009.01)
*H04W 24/10* (2009.01)
*H04W 36/30* (2009.01)
*H04W 88/08* (2009.01)
*H04W 36/18* (2009.01)
*H04W 88/12* (2009.01)
*H04W 88/02* (2009.01)

(52) U.S. Cl.
CPC .......... *H04W 36/38* (2013.01); *H04W 36/026* (2013.01); *H04W 36/18* (2013.01); *H04W 88/02* (2013.01); *H04W 88/08* (2013.01); *H04W 88/12* (2013.01)

(56) References Cited

U.S. PATENT DOCUMENTS

| | | | |
|---|---|---|---|
| 2007/0049278 A1* | 3/2007 | Lindoff | H04W 36/0055 455/439 |
| 2010/0041405 A1* | 2/2010 | Gallagher | H04W 8/02 455/436 |
| 2010/0248617 A1* | 9/2010 | Law | H04B 7/18506 455/11.1 |
| 2011/0153792 A1 | 6/2011 | Bachmann et al. | |
| 2011/0194485 A1* | 8/2011 | Horneman | H04W 72/042 370/315 |
| 2011/0275359 A1* | 11/2011 | Sebire | H04L 5/001 455/422.1 |
| 2012/0034924 A1* | 2/2012 | Kalhan | H04W 72/042 455/444 |
| 2012/0214512 A1* | 8/2012 | Siomina | G01S 5/0205 455/456.2 |
| 2013/0310040 A1* | 11/2013 | Kwun | H04W 52/0235 455/436 |
| 2013/0322395 A1* | 12/2013 | Kazmi | H04W 72/082 370/329 |
| 2014/0004863 A1 | 1/2014 | Zhang et al. | |
| 2014/0018085 A1* | 1/2014 | Young | H04W 52/0235 455/450 |
| 2014/0120919 A1* | 5/2014 | Birdi | H04W 36/0055 455/437 |
| 2014/0126403 A1* | 5/2014 | Siomina | H04W 24/10 370/252 |
| 2014/0140293 A1 | 5/2014 | Sharma et al. | |
| 2014/0200021 A1* | 7/2014 | Jiao | H04W 72/082 455/452.2 |
| 2014/0248894 A1 | 9/2014 | Kawasaki | |
| 2015/0029879 A1* | 1/2015 | Chou | H04W 72/042 370/252 |
| 2015/0043447 A1* | 2/2015 | Stojanovski | H04L 5/14 370/329 |
| 2015/0078342 A1* | 3/2015 | Chen | H04W 76/10 370/331 |
| 2015/0141002 A1 | 5/2015 | Ma et al. | |
| 2016/0330646 A1 | 11/2016 | Hu et al. | |
| 2017/0289761 A1* | 10/2017 | Stojanovski | E04H 9/025 |
| 2018/0199249 A1* | 7/2018 | Ohta | H04W 36/0033 |

FOREIGN PATENT DOCUMENTS

| | | |
|---|---|---|
| CN | 103888963 A | 6/2014 |
| EP | 2180743 A1 | 4/2010 |
| JP | 2009509369 A | 3/2009 |
| JP | 2013081142 A | 5/2013 |
| JP | 2014518481 A | 7/2014 |
| JP | 2014522598 A | 9/2014 |
| WO | 2013177768 A1 | 12/2013 |

* cited by examiner

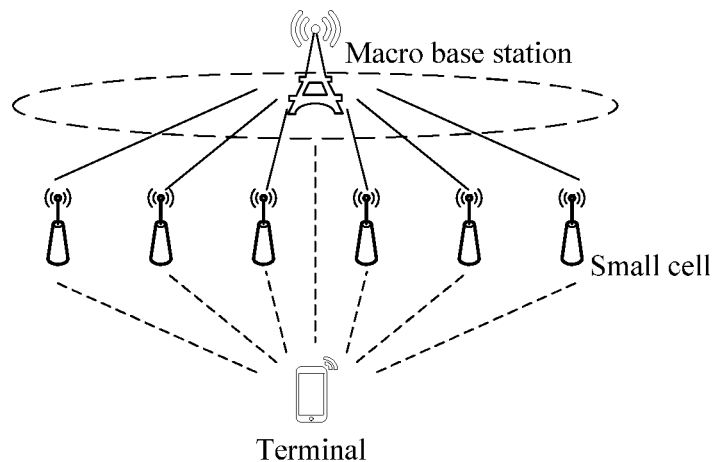
FIG. 1-a
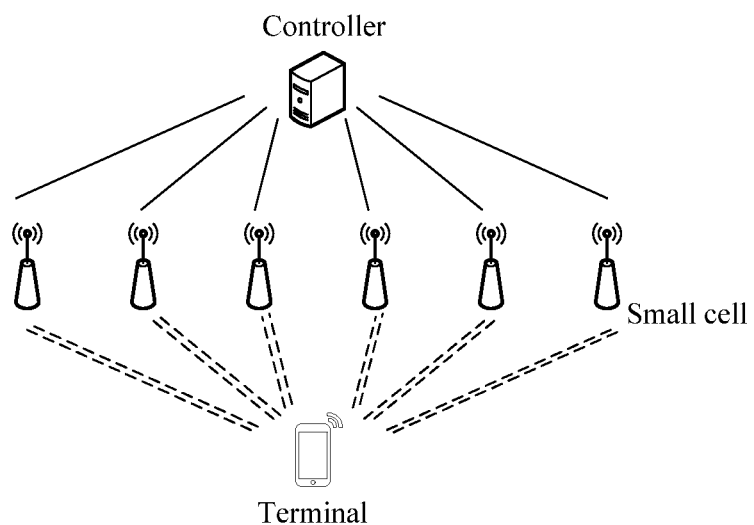
FIG. 1-b

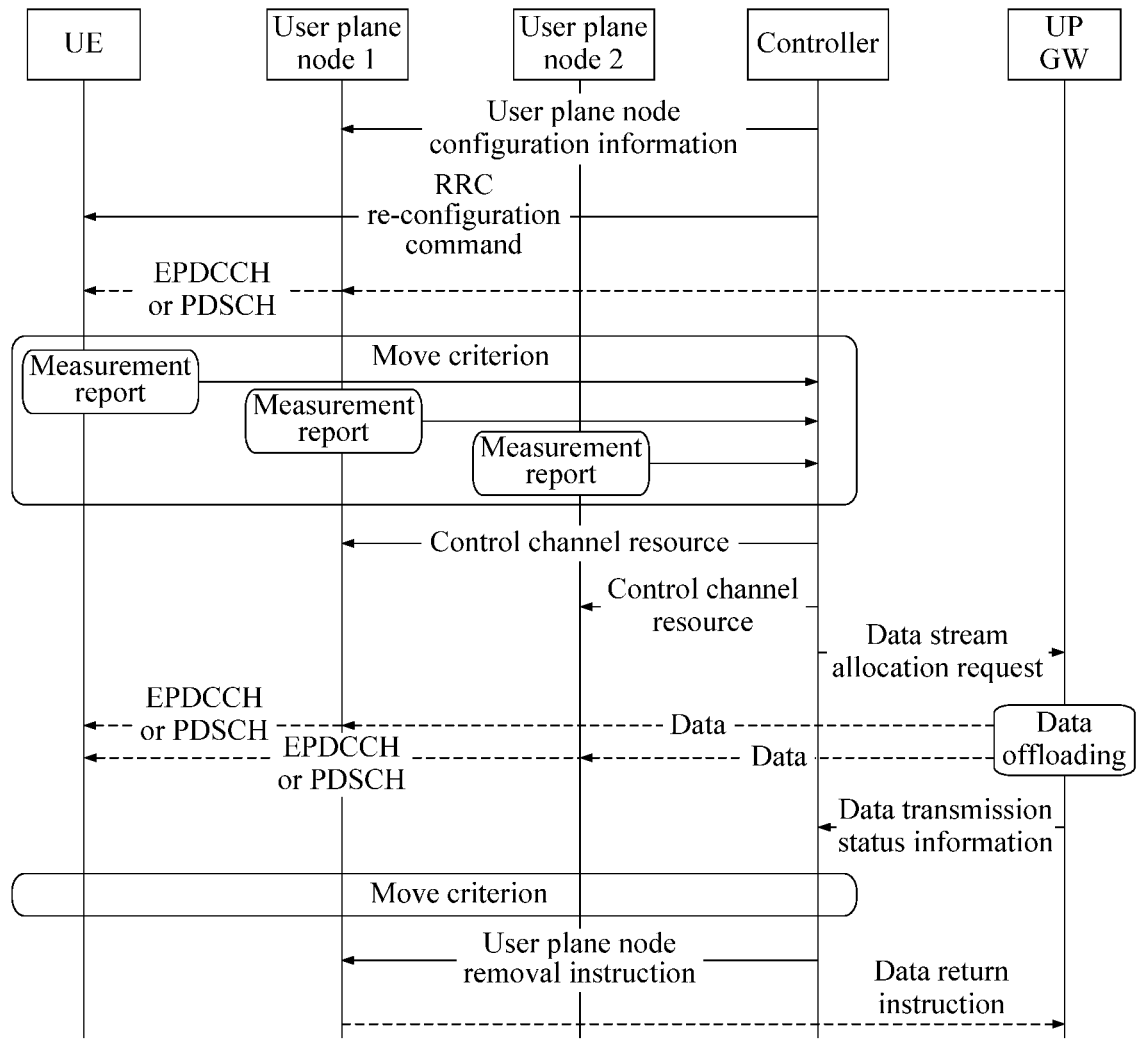
FIG. 5-a

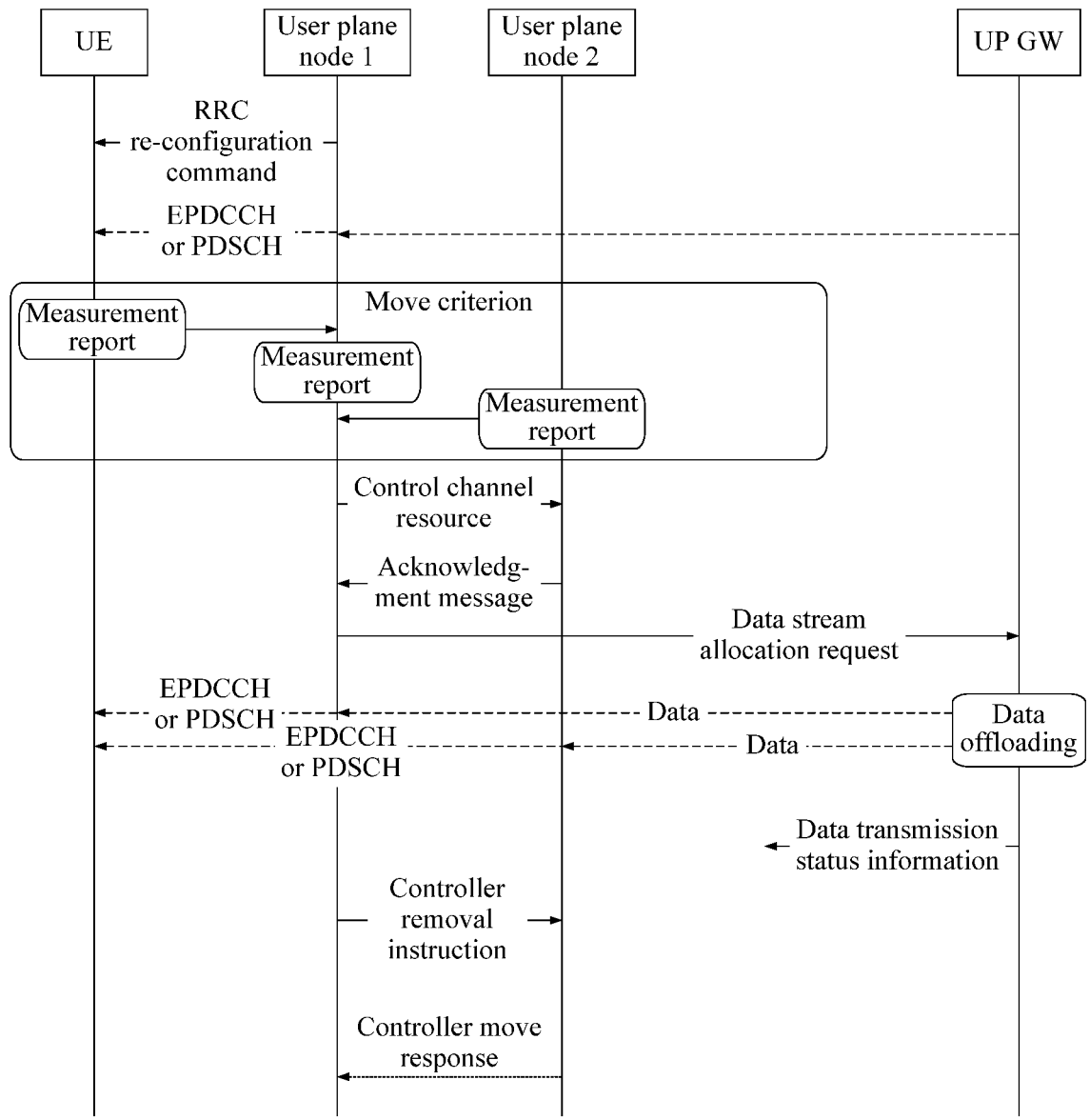
FIG. 5-b

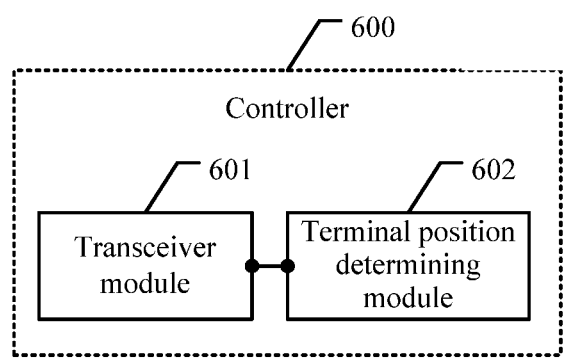
FIG. 6
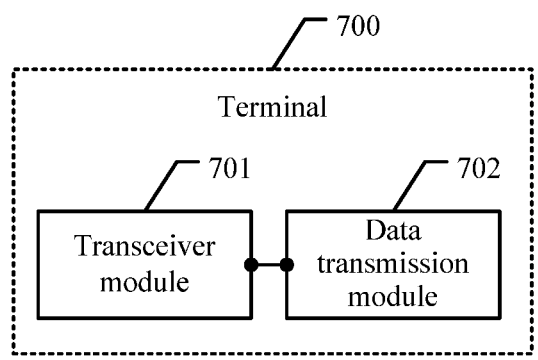
FIG. 7-a

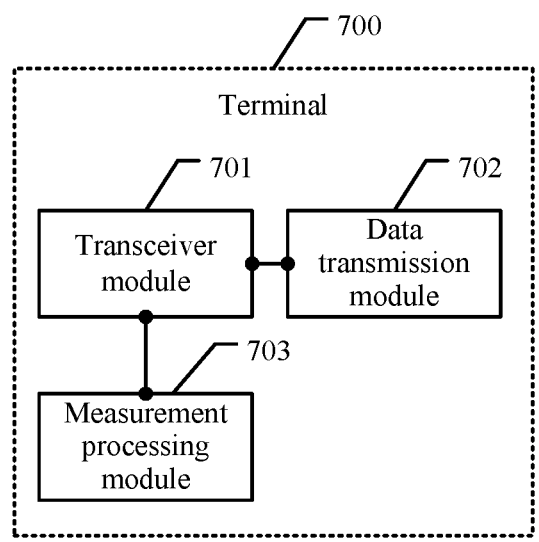
FIG. 7-b
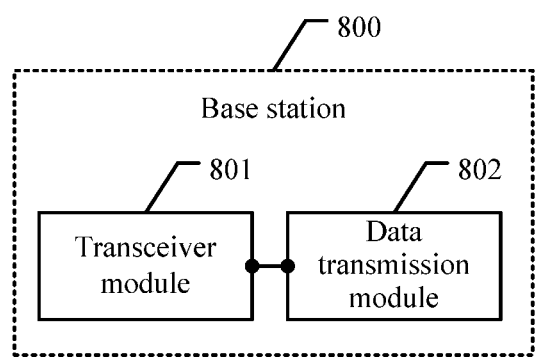
FIG. 8-a

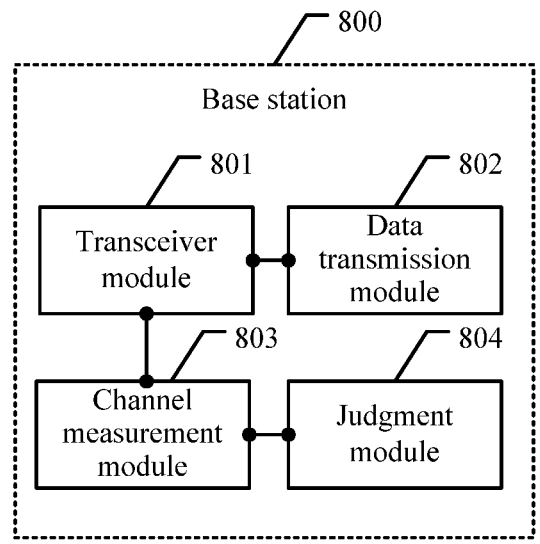
FIG. 8-b
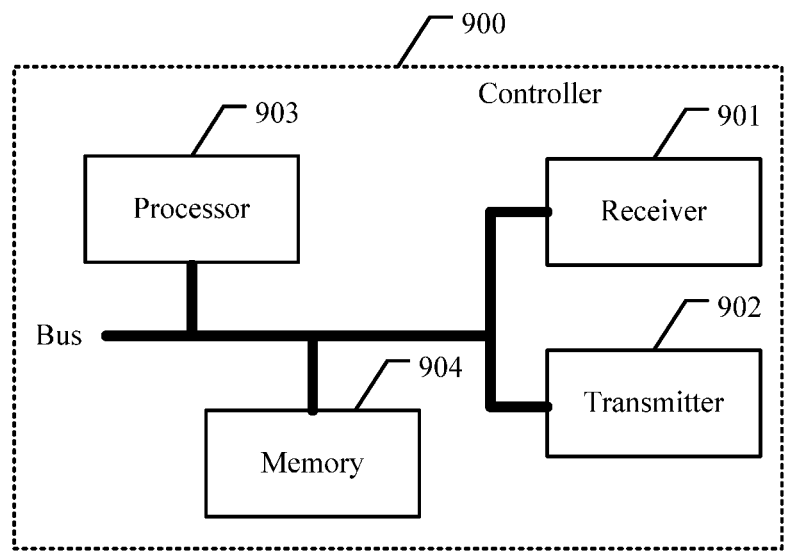
FIG. 9

TERMINAL HANDOVER METHOD, CONTROLLER, TERMINAL, BASE STATION, AND SYSTEM

CROSS-REFERENCE TO RELATED APPLICATIONS

This application is a continuation of International Application No. PCT/CN2016/111507, filed on Dec. 22, 2016, which claims priority to Chinese Patent Application No. 201511029928.3, filed on Dec. 31, 2015. All of the aforementioned patent applications are hereby incorporated by reference in their entireties.

TECHNICAL FIELD

The present invention relates to the field of communications technologies, and in particular, to a terminal handover method, a controller, a terminal, a base station, and a system.

BACKGROUND

In a future wireless network, a high throughput can be achieved in two manners. In one manner, a large quantity of multiple-input multiple-output (MIMO) antennas are used. The other is ultra-dense network deployment. The large quantity of MIMO antennas is a large quantity of antennas used at a base station, and MIMO performance easily leads to system capacity saturation due to space limitation. In an ultra-dense network, deployment costs of a micro base station are less than those of a macro base station, and an optimal connection can be achieved by means of an intelligent handover. In a long-distance location, only a micro base station needs to be deployed, while a macro base station with many antennas does not need to be deployed. A micro base station supports a plurality of radio technologies, but delivers handover performance inferior to that of a macro base station. In particular, in a mobile network in which a macro base station and a micro base station are deployed in a mixed way, mobility management for user equipment (UE) is more complex.

In such a mobile network with mixed deployment, the mobile network has an enormous size and is complex, and handovers between cells become increasingly important in device mobility management and performance analysis. Currently, as mobile networks develop, service types are diversified, and mobility complexity of user equipment grows. Consequently, a prior mechanism for handovers between cells cannot adapt to a complex network environment well.

In a handover process in a Long Term Evolution (LTE) system, there are five procedures on a control plane: measurement, measurement reporting, handover preparation, handover command, and handover completion. In the handover command and handover completion procedures, data transmission over an air interface is interrupted when a terminal is handed over from a source base station to a new target base station. Therefore, it is necessary to make handover improvement, to reduce control plane handover latency and user plane data interruption. In the handover process, the foregoing five procedures need to be performed on the control plane to complete a handover. In the handover command and handover completion procedures, however, the terminal breaks a connection to a source cell and connects to a target cell. Therefore, data transmission is interrupted in these procedures.

In the prior art, the following several handover improvement methods are used to reduce control plane handover latency and user plane data interruption. In one handover improvement method, a pre-handover method is used. Compared with the foregoing normal handover, with a handover preparation made on a possible target cell before a handover, a handover preparation procedure may no longer be required after an actual measurement report triggers a handover, and a source cell directly sends a handover command for the prepared handover target cell to the terminal. Therefore, control plane latency is shortened in a handover process. However, the terminal still needs to connect to the target cell after being disconnected from the source cell; therefore, data transmission interruption is still present in the handover process.

To further shorten the handover process, there is still the following handover improvement method in the prior art: Based on the pre-handover method, a handover process is initiated by a terminal instead of a network; therefore, on the control plane, when a terminal determines to perform a handover, the terminal is directly handed over to a prepared target cell to complete a handover process. Because user-plane data needs to be forwarded to the target cell from the source cell, data interruption is also present in the case of this method. The data interruption is not relieved until a data stream is forwarded to the target cell, after the terminal handover is completed and the target cell requests the source cell or a data forwarding node to forward the data stream.

To overcome the data interruption problem in the foregoing method, there is still the following handover improvement method in the prior art: A plurality of connections are established between a terminal and a plurality of cells, and the terminal does not break a connection to a source cell before accessing a target cell; therefore, the terminal may still continue to communicate with the source cell before being connected to the target cell, until subsequent data transmission is gradually switched to the target cell. Theoretically, the data interruption problem can be eliminated completely by using this method.

However, in the foregoing handover improvement solution, the method of establishing a plurality of connections can avoid data interruption, but the terminal still needs to identify the target cell as early as possible and add, by using signaling, the target cell to a multi-connection cell set, and needs to update the set continually, so that a plurality of connected cells may be used for multi-connection transmission at any time. When cells are deployed densely, there may be several or even tens of cells surrounding the terminal. Therefore, the prior art is subject to a problem of relatively high cell management and maintenance costs. In addition, frequent cell addition or deletion may not cause a call drop, but may greatly affect an effective transmission rate. As perceived by a user, a signal is always good, but a transmission rate is unstable, and data transmission efficiency is quite low.

SUMMARY

Embodiments of the present invention provide a terminal handover method, a controller, a terminal, a base station, and a system, to complete a terminal handover without data transmission interrupted and achieve quite high data transmission efficiency.

To resolve the foregoing technical problem, the embodiments of the present invention provide the following technical solutions:

According to a first aspect, an embodiment of the present invention provides a terminal handover method. The method includes sending, by a controller, a radio identifier and a control channel resource of a terminal that are configured by the controller to the terminal. When the terminal is located in a coverage area of a first base station, the method also includes sending, by the controller, the radio identifier and the control channel resource of the terminal to the first base station. The method further includes determining, by the controller, that the terminal is located in a coverage area of a second base station, and sending, by the controller, the radio identifier and the control channel resource of the terminal to the second base station, so that control signalling sent from the first base station and the second base station separately is received by the terminal by using the control channel resource.

In this embodiment of the present invention, the controller allocates, to the terminal, the terminal identifier and the control channel resource that can be used by the terminal in both the first base station and the second base station to which the terminal is handed over; when the terminal is located in the coverage area of the first base station, the controller also sends the radio identifier and the control channel resource that are configured for the terminal to the first base station, the controller determines that the terminal is located in the coverage area of the second base station, and the controller also sends the radio identifier and the control channel resource that are configured for the terminal to the second base station. Therefore, when the terminal moves between base stations such as the first base station and the second base station, the terminal can always use the radio identifier and the control channel resource that are configured by the controller, and re-configuration is not required. In this way, re-configuration signaling can be saved, data transmission is not interrupted when the terminal is handed over from the first base station to the second base station, and data transmission efficiency is quite high.

With reference to the first aspect, in a first possible implementation of the first aspect, the sending, by a controller, a radio identifier and a control channel resource of a terminal that are configured by the controller to the terminal includes sending, by the controller, the radio identifier and the control channel resource of the terminal to a base station initially accessed by the terminal, so that the initially accessed base station sends the radio identifier and the control channel resource of the terminal to the terminal.

In this embodiment of the present invention, the base station initially accessed by the terminal may forward the radio identifier and the control channel resource of the terminal to the terminal, and the terminal obtains the radio identifier and the control channel resource of the terminal from the initially accessed base station. When the terminal moves between base stations such as the first base station and the second base station, the terminal can always use the radio identifier and the control channel resource that are configured by the controller, and re-configuration is not required. This can save re-configuration signaling.

With reference to the first aspect, in a second possible implementation of the first aspect, the determining, by the controller, that the terminal is located in a coverage area of a second base station includes: receiving, by the controller, a measurement report that comes from the terminal and that is forwarded by a base station, where the measurement report that comes from the terminal is sent by the terminal when the terminal performs channel measurement according to measurement configuration information provided by the controller and the terminal determines that a radio signal measurement quantity between the second base station and the terminal meets a pre-set first channel condition; and determining, by the controller according to the measurement report sent by the terminal, that the terminal is located in the coverage area of the second base station; or receiving, by the controller, a first measurement report sent by the base station, where the first measurement report sent by the base station is sent when the base station determines, according to a measurement result sent by the terminal, that a radio signal measurement quantity between the base station and the terminal meets a pre-set second channel condition, and the measurement result sent by the terminal is generated after the terminal performs channel measurement according to measurement configuration information provided by the controller; and determining, by the controller according to the first measurement report sent by the base station, that the terminal is located in the coverage area of the second base station; or receiving, by the controller, a measurement result sent by the base station, where the measurement result sent by the base station is generated after the base station performs channel measurement on a position tracking signal sent by the terminal; determining, by the controller according to the measurement result sent by the base station, that a radio signal measurement quantity between the second base station and the terminal meets a pre-set third channel condition; and determining, by the controller, that the terminal is located in the coverage area of the second base station; or receiving, by the controller, a second measurement report sent by the base station, where the second measurement report sent by the base station is sent when the base station performs channel measurement on a position tracking signal sent by the terminal and determines that a radio channel measurement quantity between the base station and the terminal meets a pre-set fourth channel condition; and determining, by the controller according to the measurement report sent by the base station, that the terminal is located in the coverage area of the second base station; where the base station is the first base station and/or the second base station.

In this embodiment of the present invention, the controller may use multiple feasible manners to determine that the terminal is located in the coverage area of the second base station. In the foregoing feasible manners, the terminal may send the measurement report generated by the terminal to the controller by way of the base station, or the base station may send the measurement report generated by the base station to the controller, and the controller determines, according to the measurement report, that the terminal is located in the coverage area of the second base station; or the controller may determine by itself that the terminal is located in the coverage area of the second base station.

With reference to the first aspect, in a third possible implementation of the first aspect, the method further includes: receiving, by the controller, data transmission status information sent by a gateway, where the data transmission status information includes at least one piece of the following information: a status of data transmission between the gateway and the first base station or a status of data transmission between the gateway and the second base station; and when the controller determines that the status of data transmission between the gateway and the first base station does not meet a pre-set transmission condition, sending, by the controller, a teardown instruction to the gateway or the first base station, so that the gateway or the first base station tears down a transmission path between the gateway and the first base station.

In this embodiment of the present invention, the controller sends the path teardown instruction to the gateway or the first base station, so that the gateway or the first base station tears down the transmission path between the gateway and the first base station. Data transmission efficiency can be improved by tearing down the idle transmission path.

With reference to the first aspect, or the first or the second or the third possible implementation of the first aspect, in a fourth possible implementation of the first aspect, a control function of the controller is implemented by the first base station; or when the terminal is located in the coverage area of the first base station, a control function of the controller is implemented by the first base station, and when the terminal is located in the coverage area of the second base station, a control function of the controller is implemented by the second base station.

In this embodiment of the present invention, the controller may be implemented in multiple manners. The controller may be implemented by the first base station. The controller may alternatively be implemented in a distributed manner: As the terminal moves continually, the control function of the controller may be implemented by the first base station or the second base station. In this way, the controller is deployed quite flexibly.

According to a second aspect, an embodiment of the present invention further provides a terminal handover method. The method includes receiving, by a terminal and from a controller, a radio identifier of the terminal and a control channel resource configured by the controller. The method also includes receiving, by the terminal according to the control channel resource, control signaling sent by a base station, where the base station is a first base station and/or a second base station. The method further includes transmitting, by the terminal, data on a shared channel according to the control signalling, where the shared channel is a transmission channel configured between the base station and the terminal.

In this embodiment of the present invention, the controller allocates, to the terminal, the terminal identifier and the control channel resource that can be used by the terminal in both the first base station and the second base station to which the terminal is handed over; when the terminal is located in a coverage area of the first base station, the controller also sends the radio identifier and the control channel resource that are configured for the terminal to the first base station, the controller determines that the terminal is located in a coverage area of the second base station, and the controller also sends the radio identifier and the control channel resource that are configured for the terminal to the second base station. Therefore, when the terminal moves between base stations such as the first base station and the second base station, the terminal can always use the radio identifier and the control channel resource that are configured by the controller, and re-configuration is not required. In this way, re-configuration signaling can be saved, data transmission is not interrupted when the terminal is handed over from the first base station to the second base station, and data transmission efficiency is quite high.

With reference to the second aspect, in a first possible implementation of the second aspect, the method further includes: performing, by the terminal, channel measurement according to measurement configuration information provided by the controller, determining, according to a generated measurement result, whether a radio signal measurement quantity between the second base station and the terminal meets a pre-set first channel condition, and when the radio signal measurement quantity between the second base station and the terminal meets the pre-set first channel condition, sending, by the terminal, a measurement report to the controller by way of the base station; or performing, by the terminal, channel measurement according to measurement configuration information provided by the controller, and sending a measurement result generated by the terminal to the base station; or sending, by the terminal, a position tracking signal according to signal configuration information provided by the controller.

In this embodiment of the present invention, the controller may use multiple feasible manners to determine that the terminal is located in a coverage area of the second base station. In the foregoing feasible manner, the terminal may send the measurement report generated by the terminal to the controller by way of the base station, or the base station may send the measurement report generated by the base station to the controller, and the controller determines, according to the measurement report, that the terminal is located in the coverage area of the second base station; or the controller may determine by itself that the terminal is located in the coverage area of the second base station.

With reference to the second aspect, in a second possible implementation of the second aspect, the transmitting, by the terminal, data on a shared channel according to the control signalling includes: receiving, by the terminal and on the shared channel, downlink data sent by the first base station and/or the second base station; and/or sending, by the terminal, uplink data to the first base station and/or the second base station on the shared channel.

In this embodiment of the present invention, the terminal may perform data transmission with both the first base station and the second base station, and this data transmission may be uplink transmission or downlink transmission. This can improve data transmission efficiency.

With reference to the first or the second possible implementation of the second aspect, in a third possible implementation of the second aspect, a control function of the controller is implemented by the first base station; or when the terminal is located in a coverage area of the first base station, a control function of the controller is implemented by the first base station, and when the terminal is located in a coverage area of the second base station, a control function of the controller is implemented by the second base station.

In this embodiment of the present invention, the controller may be implemented in multiple manners. The controller may be implemented by the first base station. The controller may alternatively be implemented in a distributed manner: As the terminal moves continually, the control function of the controller may be implemented by the first base station or the second base station. In this way, the controller is deployed quite flexibly.

According to a third aspect, an embodiment of the present invention further provides a terminal handover method. The method includes receiving, by a base station and from a controller, a radio identifier of a terminal and a control channel resource configured by the controller, where the base station is a first base station and/or a second base station. The method also includes sending, by the base station, control signaling to the terminal by using the control channel resource. The method further includes transmitting, by the base station, data on a shared channel between the base station and the terminal.

In this embodiment of the present invention, the controller allocates, to the terminal, the terminal identifier and the control channel resource that can be used by the terminal in both the first base station and the second base station to which the terminal is handed over; when the terminal is located in a coverage area of the first base station, the controller also sends the radio identifier and the control channel resource that are configured for the terminal to the first base station, the controller determines that the terminal is located in a coverage area of the second base station, and the controller also sends the radio identifier and the control channel resource that are configured for the terminal to the second base station. Therefore, when the terminal moves between base stations such as the first base station and the second base station, the terminal can always use the radio identifier and the control channel resource that are configured by the controller, and re-configuration is not required. In this way, re-configuration signaling can be saved, data transmission is not interrupted when the terminal is handed over from the first base station to the second base station, and data transmission efficiency is quite high.

With reference to the third aspect, in a first possible implementation of the third aspect, the method further includes: receiving, by the base station, a measurement report sent by the terminal, where the measurement report sent by the terminal is sent by the terminal when the terminal performs channel measurement according to measurement configuration information provided by the controller and determines that a radio signal measurement quantity between the second base station and the terminal meets a pre-set first channel condition; and forwarding, to the controller, the measurement report sent by the terminal; or receiving, by the base station, a measurement result sent by the terminal, where the measurement result sent by the terminal is generated after the terminal performs channel measurement according to measurement configuration information provided by the controller; and sending a measurement report to the controller when the base station determines, according to the measurement result, that a radio signal measurement quantity between the base station and the terminal meets a pre-set second channel condition; or generating, by the base station, a measurement result after performing channel measurement on a position tracking signal sent by the terminal, and sending the measurement result generated by the base station to the controller; or performing, by the base station, channel measurement on a position tracking signal sent by the terminal, and sending, by the base station, a measurement report generated by the base station to the controller when the base station determines that a radio channel measurement quantity between the base station and the terminal meets a pre-set fourth channel condition.

In this embodiment of the present invention, the controller may use multiple feasible manners to determine that the terminal is located in a coverage area of the second base station. In the foregoing feasible manners, the terminal may send the measurement report generated by the terminal to the controller by way of the base station, or the base station may send the measurement report generated by the base station to the controller, and the controller determines, according to the measurement report, that the terminal is located in the coverage area of the second base station; or the controller may determine by itself that the terminal is located in the coverage area of the second base station.

With reference to the third aspect or the first possible implementation of the third aspect, in a second possible implementation of the third aspect, the method further includes: when the base station is the first base station, implementing, by the first base station, a control function of the controller; or when the terminal is located in a coverage area of the first base station, implementing, by the first base station, a control function of the controller, and when the terminal is located in a coverage area of the second base station, sending, by the first base station, a control function move instruction to the second base station, where the control function move instruction includes configuration context of the terminal.

In this embodiment of the present invention, the controller may be implemented in multiple manners. The controller may be implemented by the first base station. The controller may alternatively be implemented in a distributed manner: As the terminal moves continually, the control function of the controller may be implemented by the first base station or the second base station. In this way, the controller is deployed quite flexibly.

According to a fourth aspect, an embodiment of the present invention further provides a controller, including a transceiver module and a terminal position determining module. The transceiver module is configured to: send a radio identifier and a control channel resource of a terminal that are configured by the controller to the terminal; and when the terminal is located in a coverage area of a first base station, send the radio identifier and the control channel resource of the terminal to the first base station. The terminal position determining module is configured to determine that the terminal is located in a coverage area of a second base station. The transceiver module is further configured to send the radio identifier and the control channel resource of the terminal to the second base station, so that control signalling sent from the first base station and the second base station separately is received by the terminal by using the control channel resource.

In this embodiment of the present invention, the controller allocates, to the terminal, the terminal identifier and the control channel resource that can be used by the terminal in both the first base station and the second base station to which the terminal is handed over; when the terminal is located in the coverage area of the first base station, the controller also sends the radio identifier and the control channel resource that are configured for the terminal to the first base station, the controller determines that the terminal is located in the coverage area of the second base station, and the controller also sends the radio identifier and the control channel resource that are configured for the terminal to the second base station. Therefore, when the terminal moves between base stations such as the first base station and the second base station, the terminal can always use the radio identifier and the control channel resource that are configured by the controller, and re-configuration is not required. In this way, re-configuration signaling can be saved, data transmission is not interrupted when the terminal is handed over from the first base station to the second base station, and data transmission efficiency is quite high.

With reference to the fourth aspect, in a first possible implementation of the fourth aspect, the transceiver module is specifically configured to send the radio identifier and the control channel resource of the terminal to a base station initially accessed by the terminal, so that the initially accessed base station sends the radio identifier and the control channel resource of the terminal to the terminal.

In this embodiment of the present invention, the base station initially accessed by the terminal may forward the radio identifier and the control channel resource of the terminal to the terminal, and the terminal obtains the radio identifier and the control channel resource of the terminal from the initially accessed base station. When the terminal moves between base stations such as the first base station and the second base station, the terminal can always use the radio identifier and the control channel resource that are configured by the controller, and re-configuration is not required. This can save re-configuration signalling.

With reference to the fourth aspect, in a second possible implementation of the fourth aspect, the transceiver module is further configured to receive a measurement report that comes from the terminal and that is forwarded by a base station, where the measurement report that comes from the terminal is sent by the terminal when the terminal performs channel measurement according to measurement configuration information provided by the controller and the terminal determines that a radio signal measurement quantity between the second base station and the terminal meets a pre-set first channel condition; and the terminal position determining module is specifically configured to determine, according to the measurement report sent by the terminal, that the terminal is located in the coverage area of the second base station; or the transceiver module is further configured to receive a first measurement report sent by the base station, where the first measurement report sent by the base station is sent when the base station determines, according to a measurement result sent by the terminal, that a radio signal measurement quantity between the base station and the terminal meets a pre-set second channel condition, and the measurement result sent by the terminal is generated after the terminal performs channel measurement according to measurement configuration information provided by the controller; and the terminal position determining module is specifically configured to determine, according to the measurement report sent by the base station, that the terminal is located in the coverage area of the second base station; or the transceiver module is further configured to receive a measurement result sent by the base station, where the measurement result sent by the base station is generated after the base station performs channel measurement on a position tracking signal sent by the terminal; and the terminal position determining module is specifically configured to determine, according to the measurement result sent by the base station, that a radio signal measurement quantity between the second base station and the terminal meets a pre-set third channel condition, and determine that the terminal is located in the coverage area of the second base station; or the transceiver module is further configured to receive a second measurement report sent by the base station, where the second measurement report sent by the base station is sent when the base station performs channel measurement on a position tracking signal sent by the terminal and determines that a radio channel measurement quantity between the base station and the terminal meets a pre-set fourth channel condition; and the terminal position determining module is specifically configured to determine, according to the measurement report sent by the base station, that the terminal is located in the coverage area of the second base station; where the base station is the first base station and/or the second base station.

In this embodiment of the present invention, the controller may use multiple feasible manners to determine that the terminal is located in the coverage area of the second base station. In the foregoing feasible manners, the terminal may send the measurement report generated by the terminal to the controller by way of the base station, or the base station may send the measurement report generated by the base station to the controller, and the controller determines, according to the measurement report, that the terminal is located in the coverage area of the second base station; or the controller may determine by itself that the terminal is located in the coverage area of the second base station.

With reference to the fourth aspect, in a third possible implementation of the fourth aspect, the transceiver module is further configured to: receive data transmission status information sent by a gateway, where the data transmission status information includes at least one piece of the following information: a status of data transmission between the gateway and the first base station or a status of data transmission between the gateway and the second base station; and when the controller determines that the status of data transmission between the gateway and the first base station does not meet a pre-set transmission condition, send a teardown instruction to the gateway or the first base station, so that the gateway or the first base station tears down a transmission path between the gateway and the first base station.

In this embodiment of the present invention, the controller sends the path teardown instruction to the gateway or the first base station, so that the gateway or the first base station tears down the transmission path between the gateway and the first base station. Data transmission efficiency can be improved by tearing down the idle transmission path.

With reference to the fourth aspect, or the first or the second or the third possible implementation of the fourth aspect, in a fourth possible implementation of the fourth aspect, a control function of the controller is implemented by the first base station; or when the terminal is located in the coverage area of the first base station, a control function of the controller is implemented by the first base station, and when the terminal is located in the coverage area of the second base station, a control function of the controller is implemented by the second base station.

In this embodiment of the present invention, the controller may be implemented in multiple manners. The controller may be implemented by the first base station. The controller may alternatively be implemented in a distributed manner: As the terminal moves continually, the control function of the controller may be implemented by the first base station or the second base station. In this way, the controller is deployed quite flexibly.

According to a fifth aspect, an embodiment of the present invention further provides a terminal, including a transceiver module and a data transmission module, where the transceiver module is configured to: receive, from a controller, a radio identifier of the terminal and a control channel resource configured by the controller; and receive, according to the control channel resource, control signaling sent by a base station, where the base station is a first base station and/or a second base station; and the data transmission module is configured to transmit data on a shared channel according to the control signalling, where the shared channel is a transmission channel configured between the base station and the terminal.

In this embodiment of the present invention, the controller allocates, to the terminal, the terminal identifier and the control channel resource that can be used by the terminal in both the first base station and the second base station to which the terminal is handed over; when the terminal is located in a coverage area of the first base station, the controller also sends the radio identifier and the control channel resource that are configured for the terminal to the first base station, the controller determines that the terminal is located in a coverage area of the second base station, and the controller also sends the radio identifier and the control channel resource that are configured for the terminal to the second base station. Therefore, when the terminal moves between base stations such as the first base station and the second base station, the terminal can always use the radio identifier and the control channel resource that are configured by the controller, and re-configuration is not required. In this way, re-configuration signaling can be saved, data transmission is not interrupted when the terminal is handed over from the first base station to the second base station, and data transmission efficiency is quite high.

With reference to the fifth aspect, in a first possible implementation of the fifth aspect, the terminal further includes a measurement processing module and a transceiver module. The measurement processing module is configured to: perform channel measurement according to measurement configuration information provided by the controller, and determine, according to a generated measurement result, whether a radio signal measurement quantity between the second base station and the terminal meets a pre-set first channel condition. The transceiver module is further configured to: when the radio signal measurement quantity between the second base station and the terminal meets the pre-set first channel condition, send a measurement report to the controller by way of the base station. Alternatively, the measurement processing module is configured to perform channel measurement according to measurement configuration information provided by the controller, and the transceiver module is further configured to send a measurement result generated by the terminal to the base station; or the transceiver module is further configured to send a position tracking signal according to signal configuration information provided by the controller.

In this embodiment of the present invention, the controller may use multiple feasible manners to determine that the terminal is located in a coverage area of the second base station. In the foregoing feasible manners, the terminal may send the measurement report generated by the terminal to the controller by way of the base station, or the base station may send the measurement report generated by the base station to the controller, and the controller determines, according to the measurement report, that the terminal is located in the coverage area of the second base station; or the controller may determine by itself that the terminal is located in the coverage area of the second base station.

With reference to the fifth aspect, in a second possible implementation of the fifth aspect, the data transmission module is specifically configured to: receive, on the shared channel, downlink data sent by the first base station and/or the second base station; and/or send uplink data to the first base station and/or the second base station on the shared channel.

In this embodiment of the present invention, the terminal may perform data transmission with both the first base station and the second base station, and this data transmission may be uplink transmission or downlink transmission. This can improve data transmission efficiency.

With reference to the first or the second possible implementation of the fifth aspect, in a third possible implementation of the fifth aspect, a control function of the controller is implemented by the first base station; or when the terminal is located in a coverage area of the first base station, a control function of the controller is implemented by the first base station, and when the terminal is located in a coverage area of the second base station, a control function of the controller is implemented by the second base station.

In this embodiment of the present invention, the controller may be implemented in multiple manners. The controller may be implemented by the first base station. The controller may alternatively be implemented in a distributed manner: As the terminal moves continually, the control function of the controller may be implemented by the first base station or the second base station. In this way, the controller is deployed quite flexibly.

According to a sixth aspect, an embodiment of the present invention further provides a base station, where the base station is specifically a first base station and/or a second base station, and the base station includes a transceiver module and a data transmission module. The transceiver module is configured to: receive, from a controller, a radio identifier of a terminal and a control channel resource configured by the controller; and send control signaling to the terminal by using the control channel resource. The data transmission module is configured to transmit data on a shared channel between the base station and the terminal.

In this embodiment of the present invention, the controller allocates, to the terminal, the terminal identifier and the control channel resource that can be used by the terminal in both the first base station and the second base station to which the terminal is handed over; when the terminal is located in a coverage area of the first base station, the controller also sends the radio identifier and the control channel resource that are configured for the terminal to the first base station, the controller determines that the terminal is located in a coverage area of the second base station, and the controller also sends the radio identifier and the control channel resource that are configured for the terminal to the second base station. Therefore, when the terminal moves between base stations such as the first base station and the second base station, the terminal can always use the radio identifier and the control channel resource that are configured by the controller, and re-configuration is not required. In this way, re-configuration signaling can be saved, data transmission is not interrupted when the terminal is handed over from the first base station to the second base station, and data transmission efficiency is quite high.

With reference to the sixth aspect, in a first possible implementation of the sixth aspect, the base station further includes a channel measurement module and a judgment module the transceiver module is further configured to: receive a measurement report sent by the terminal, where the measurement report sent by the terminal is sent by the terminal when the terminal performs channel measurement according to measurement configuration information provided by the controller and determines that a radio signal measurement quantity between the second base station and the terminal meets a pre-set first channel condition; and forward, to the controller, the measurement report sent by the terminal; or the transceiver module is further configured to receive a measurement result sent by the terminal, where the measurement result sent by the terminal is generated after the terminal performs channel measurement according to measurement configuration information provided by the controller; the judgment module is configured to determine, according to the measurement result, that a radio signal measurement quantity between the base station and the terminal meets a pre-set second channel condition; and the transceiver module is further configured to send the measurement report to the controller; or the channel measurement module is configured to generate a measurement result after performing channel measurement on a position tracking signal sent by the terminal, and the transceiver module is further configured to send, to the controller, the measurement result generated by the base station; or the channel measurement module is further configured to perform channel measurement on a position tracking signal sent by the terminal, the judgment module is further configured to determine that a radio channel measurement quantity between the base station and the terminal meets a pre-set fourth channel condition, and the transceiver module is further configured to send the measurement report generated by the base station to the controller.

In this embodiment of the present invention, the controller may use multiple feasible manners to determine that the terminal is located in a coverage area of the second base station. In the foregoing feasible manners, the terminal may send the measurement report generated by the terminal to the controller by way of the base station, or the base station may send the measurement report generated by the base station to the controller, and the controller determines, according to the measurement report, that the terminal is located in the coverage area of the second base station; or the controller may determine by itself that the terminal is located in the coverage area of the second base station.

With reference to the sixth aspect or the first possible implementation of the sixth aspect, in a second possible implementation of the sixth aspect, when the base station is the first base station, a control function of the controller is implemented by the first base station; or when the terminal is located in a coverage area of the first base station, a control function of the controller is implemented by the first base station, and when the terminal is located in a coverage area of the second base station, the first base station sends a control function move instruction to the second base station, where the control function move instruction includes configuration context of the terminal.

In this embodiment of the present invention, the controller may be implemented in multiple manners. The controller may be implemented by the first base station. The controller may alternatively be implemented in a distributed manner: As the terminal moves continually, the control function of the controller may be implemented by the first base station or the second base station. In this way, the controller is deployed quite flexibly.

According to a seventh aspect, an embodiment of the present invention further provides a controller, including a receiver, a transmitter, a processor, and a memory. The processor is configured to execute the terminal handover method recorded in the first aspect and the possible implementations.

In this embodiment of the present invention, the controller allocates, to the terminal, the terminal identifier and the control channel resource that can be used by the terminal in both the first base station and the second base station to which the terminal is handed over; when the terminal is located in a coverage area of the first base station, the controller also sends the radio identifier and the control channel resource that are configured for the terminal to the first base station, the controller determines that the terminal is located in a coverage area of the second base station, and the controller also sends the radio identifier and the control channel resource that are configured for the terminal to the second base station. Therefore, when the terminal moves between base stations such as the first base station and the second base station, the terminal can always use the radio identifier and the control channel resource that are configured by the controller, and re-configuration is not required. In this way, re-configuration signaling can be saved, data transmission is not interrupted when the terminal is handed over from the first base station to the second base station, and data transmission efficiency is quite high.

According to an eighth aspect, an embodiment of the present invention further provides a terminal, including a receiver, a transmitter, a processor, and a memory. The processor is configured to execute the terminal handover method recorded in the second aspect and the possible implementations.

In this embodiment of the present invention, the controller allocates, to the terminal, the terminal identifier and the control channel resource that can be used by the terminal in both the first base station and the second base station to which the terminal is handed over; when the terminal is located in a coverage area of the first base station, the controller also sends the radio identifier and the control channel resource that are configured for the terminal to the first base station, the controller determines that the terminal is located in a coverage area of the second base station, and the controller also sends the radio identifier and the control channel resource that are configured for the terminal to the second base station. Therefore, when the terminal moves between base stations such as the first base station and the second base station, the terminal can always use the radio identifier and the control channel resource that are configured by the controller, and re-configuration is not required. In this way, re-configuration signaling can be saved, data transmission is not interrupted when the terminal is handed over from the first base station to the second base station, and data transmission efficiency is quite high.

According to a ninth aspect, an embodiment of the present invention further provides a base station, including a receiver, a transmitter, a processor, and a memory. The processor is configured to execute the terminal handover method recorded in the third aspect and the possible implementations.

In this embodiment of the present invention, the controller allocates, to the terminal, the terminal identifier and the control channel resource that can be used by the terminal in both the first base station and the second base station to which the terminal is handed over; when the terminal is located in a coverage area of the first base station, the controller also sends the radio identifier and the control channel resource that are configured for the terminal to the first base station, the controller determines that the terminal is located in a coverage area of the second base station, and the controller also sends the radio identifier and the control channel resource that are configured for the terminal to the second base station. Therefore, when the terminal moves between base stations such as the first base station and the second base station, the terminal can always use the radio identifier and the control channel resource that are configured by the controller, and re-configuration is not required. In this way, re-configuration signalling can be saved, data transmission is not interrupted when the terminal is handed over from the first base station to the second base station, and data transmission efficiency is quite high.

According to a tenth aspect, an embodiment of the present invention further provides a terminal handover system chip, including a communications interface, a bus, a processor, and a memory. The chip interacts with an external device by using the communications interface, the communications interface communicates with the processor and the memory by using the bus, and the memory stores source program code required for the terminal handover method. The processor is configured to invoke the code stored by the memory, to execute the terminal handover method executed by the controller in the first aspect and the possible implementations.

According to an eleventh aspect, an embodiment of the present invention further provides a terminal handover system chip, including a communications interface, a bus, a processor, and a memory. The chip interacts with an external device by using the communications interface, the communications interface communicates with the processor and the memory by using the bus, and the memory stores source program code required for the terminal handover method. The processor is configured to invoke the code stored by the memory, to execute the terminal handover method executed by the terminal in the second aspect and the possible implementations.

According to a twelfth aspect, an embodiment of the present invention further provides a terminal handover system chip, including a communications interface, a bus, a processor, and a memory. The chip interacts with an external device by using the communications interface, the communications interface communicates with the processor and the memory by using the bus, and the memory stores source program code required for the terminal handover method. The processor is configured to invoke the code stored by the memory, to execute the terminal handover method executed by the base station in the third aspect and the possible implementations.

According to a thirteenth aspect, an embodiment of the present invention further provides a computer program, configured to execute the terminal handover method recorded in the first aspect and the possible implementations.

According to a fourteenth aspect, an embodiment of the present invention further provides a computer program, configured to execute the terminal handover method recorded in the second aspect and the possible implementations.

According to a fifteenth aspect, an embodiment of the present invention further provides a computer program, configured to execute the terminal handover method recorded in the third aspect and the possible implementations.

According to a sixteenth aspect, an embodiment of the present invention further provides a terminal handover system, including the controller according to any possible implementation of the fourth aspect, the terminal according to any possible implementation of the fifth aspect, and the base station according to any possible implementation of the sixth aspect, where the base station is the first base station and/or the second base station.

According to a seventeenth aspect, an embodiment of the present invention further provides a terminal handover system, including the controller according to any possible implementation of the seventh aspect, the terminal according to any possible implementation of the eighth aspect, and the base station according to any possible implementation of the ninth aspect, where the base station is the first base station and/or the second base station.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person skilled in the art may still derive other drawings from these accompanying drawings.

FIG. 1-$a$ is a schematic diagram of a deployment architecture of a terminal handover method according to an embodiment of the present invention;

FIG. 1-$b$ is a schematic diagram of another deployment architecture of a terminal handover method according to an embodiment of the present invention;

FIG. 5-$a$ is a schematic diagram of an application scenario of a terminal handover method according to an embodiment of the present invention;

FIG. 5-$b$ is a schematic diagram of another application scenario of a terminal handover method according to an embodiment of the present invention;

FIG. 6 is a schematic structural diagram of composition of a controller according to an embodiment of the present invention;

FIG. 7-$a$ is a schematic structural diagram of composition of a terminal according to an embodiment of the present invention;

FIG. 7-$b$ is a schematic structural diagram of another composition of a terminal according to an embodiment of the present invention;

FIG. 8-$a$ is a schematic structural diagram of composition of a base station according to an embodiment of the present invention;

FIG. 8-$b$ is a schematic structural diagram of another composition of a base station according to an embodiment of the present invention;

FIG. 9 is a schematic structural diagram of composition of another controller according to an embodiment of the present invention;

DETAILED DESCRIPTION OF ILLUSTRATIVE EMBODIMENTS

Figure 2:
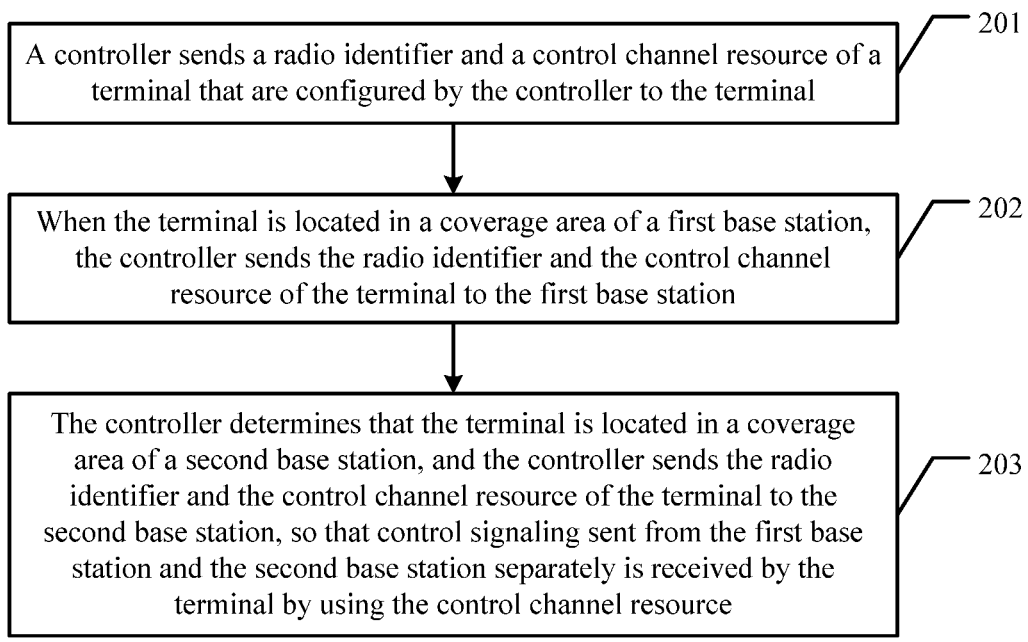
FIG. 2 is a schematic block diagram of a procedure of a terminal handover method according to an embodiment of the present invention.

Disclosed embodiments provide a terminal handover method, a controller, a terminal, a base station, and a system, to complete a terminal handover without data transmission interrupted and achieve quite high data transmission efficiency.

To make the invention objectives, features, and advantages of the present invention clearer and more comprehensible, the following describes the technical solutions in the embodiments of the present invention with reference to the accompanying drawings in the embodiments of the present invention. Apparently, the embodiments described in the following are merely some rather than all of the embodiments of the present invention. All other embodiments obtained by a person skilled in the art based on the embodiments of the present invention shall fall within the protection scope of the present invention.

In the specification, claims, and accompanying drawings of the present invention, the terms "first", "second", and so on are intended to distinguish between similar objects but do not necessarily indicate a specific order or sequence. It should be understood that the terms used in such a way are interchangeable in proper circumstances, which is merely a discrimination manner that is used when objects having a same attribute are described in the embodiments of the present invention. In addition, the terms "including", "comprising" and any other variants mean to cover the non-exclusive inclusion, so that a process, method, system, product, or device that includes a series of units is not necessarily limited to those units, but may include other units not expressly listed or inherent to such a process, method, product, or device.

The terminal handover method provided in the embodiments of the present invention is mainly applied to a wireless communications system, including but not limited to an LTE system, a Long Term Evolution Advanced (LTE-A) system, a wireless local area network such as a Wireless Fidelity (WIFI) system, a Worldwide Interoperability for Microwave Access (WiMAX) system, a fourth-generation mobile communications (4G) system, a 4G evolved system, or a fifth-generation mobile communications (5G) system. The base station provided in the embodiments of the present invention may be specifically a second-generation mobile communications (2G) base station, a third-generation mobile communications (3G) base station, an evolved NodeB (eNB) in an LTE system, a home evolved nodeB (HeNB), a relay, a femto base station, a pico base station, an access point (AP) in a WiFi system, or a base station in a 5G system. The terminal provided in the embodiments of the present invention is specifically user equipment (UE), customer premise equipment (CPE), a station (STA) in a WiFi system, or a 5G terminal.

A deployment architecture of the terminal handover method provided in the embodiments of the present invention is first described with examples, as shown in FIG. 1-a and FIG. 1-b. FIG. 1-a is a schematic diagram of a deployment architecture of the terminal handover method provided in the embodiments of the present invention. FIG. 1-b is a schematic diagram of another deployment architecture of the terminal handover method provided in the embodiments of the present invention. FIG. 1-a and FIG. 1-b respectively show two typical deployment scenarios provided in the embodiments of the present invention. In FIG. 1-a, a plurality of small cells are deployed within a coverage area of a macro base station, a terminal can move between the small cells, and can receive a radio signal from the macro base station. In FIG. 1-a, the terminal directly communicates with the macro base station, and the macro base station directly sends control signalling to the terminal, to configure a radio resource parameter of the terminal. Data connections are established between the terminal and the plurality of small cells, and the terminal receives and sends data by means of the data connections. The macro base station and the small cells are connected over interfaces. A difference between FIG. 1-b and FIG. 1-a lies in whether there is coverage of a macro base station. As shown in FIG. 1-b, in a scenario in which there is no macro base station, for example, an indoor scenario, both control signaling and data are sent by the small cells, and may be sent by one or several of the small cells. In both FIG. 1-a and FIG. 1-b, control signaling is managed and generated by a centralized controller that is connected to the plurality of small cells. In FIG. 1-a, a control function of the centralized controller may be a part of the macro base station, the centralized controller may be deployed in the macro base station, and the centralized controller is implemented by using the control function of the macro base station. In FIG. 1-b, the centralized controller is an independent controller. It should be noted that, no gateway is shown in either FIG. 1-a or FIG. 1-b, but in the embodiments of the present invention, a gateway may be connected to the controller.

Next, the following separately describes in detail the terminal handover method provided in embodiments of the present invention in respective of a controller, a terminal, and a base station.

Referring to FIG. 2, an embodiment of the present invention provides a terminal handover method. Detailed descriptions are provided in respective of a controller side. The controller can perform the following steps.

201. The controller sends a radio identifier and a control channel resource of a terminal that are configured by the controller to the terminal.

In this embodiment of the present invention, when the terminal initially accesses a mobile network, for example, when the terminal accesses the network over an air interface, the terminal accesses the mobile network after procedures such as authentication and service requesting. After the terminal accesses the network, in an example in which the terminal camps on a first base station, the controller allocates a resource pool to the terminal. The resource pool includes one of the following: the radio identifier information or the control channel resource of the terminal. The control channel resource may include a downlink control channel and/or signal resource, and an uplink control channel and/or signal resource. Without being limited, the resource pool configured for the terminal by the controller may further include cell configuration information. For example, the controller may configure cell configuration information of a plurality of base stations near the terminal. It should be noted that in this embodiment of the present invention, the resource pool allocated to the terminal by the controller is effective within all of the plurality of base stations near the terminal, that is, what the controller configures for the terminal is general resource pool information. Therefore, the terminal can use the resource pool configured by the controller, with no need to distinguish between the first base station and a second base station.

In some embodiments of the present invention, that the controller sends a radio identifier and a control channel resource of a terminal that are configured by the controller to the terminal in step 201 specifically includes the following step: The controller sends the radio identifier and the control channel resource of the terminal to a base station initially accessed by the terminal, so that the initially accessed base station sends the radio identifier and the control channel resource of the terminal to the terminal.

After the terminal initially accesses the mobile network, the controller sends the radio identifier and the control channel resource of the terminal to the base station initially accessed by the terminal, and then the initially accessed base station sends the radio identifier and the control channel resource of the terminal to the terminal. For example, the base station initially accessed by the terminal may be the first base station, or may be another base station in which the terminal is located before entering a coverage area of the first base station. No limitation is imposed on a specific implementation. It should be noted that in this embodiment of the present invention, the radio identifier and the control channel resource of the terminal that are configured for the terminal by the controller have been configured for the terminal when the terminal initially accesses the mobile network. Therefore, when moving between a plurality of base stations or cells, the terminal may always use one resource pool. The resource pool includes the radio identifier and the control channel resource, and re-configuration is not required. In this way, re-configuration signaling can be saved. The terminal does not need to wait for new configuration when moving from one base station to another base station or from one cell to another cell. This may be transparent to the terminal or the terminal is unaware of the change. The base station initially accessed by the terminal sends the radio identifier and the control channel resource of the terminal to the terminal, and afterwards, new resource pool configuration is not required regardless of which base station the terminal is handed over to.

202. When the terminal is located in a coverage area of a first base station, the controller sends the radio identifier and the control channel resource of the terminal to the first base station.

In this embodiment of the present invention, when the terminal moves to the coverage area of the first base station, the controller also sends, to the first base station, the radio identifier and the control channel resource that are configured by the controller and that have been sent to the terminal. For example, the controller obtains, from the resource pool, the radio identifier and the control channel resource of the terminal that are allocated to the first base station, and sends the radio identifier and the control channel resource of the terminal to the first base station. In addition, a connection is established between the controller and a gateway, and the controller may obtain transmission configuration information of the gateway. For example, the transmission configuration information may include an Internet Protocol (IP) address of the gateway and tunnel information of the gateway. In some embodiments of the present invention, the controller may further send the transmission configuration information of the gateway to the first base station. In this case, the gateway and the first base station may establish a transmission path between the gateway and the first base station. For a process of establishing a transmission path between the gateway and the first base station, refer to the prior art, and details are not described herein.

In this embodiment of the present invention, a transmission path is established between the gateway and the first base station, and the first base station has obtained the radio identifier and the control channel resource of the terminal that are allocated by the controller. Therefore, the first base station may send control signaling to the terminal by using the control channel resource. The control signaling may be scheduling information of a shared channel, and is used to instruct the terminal to transmit data on the shared channel.

203. The controller determines that the terminal is located in a coverage area of a second base station, and the controller sends the radio identifier and the control channel resource of the terminal to the second base station, so that control signaling sent from the first base station and the second base station separately is received by the terminal by using the control channel resource.

In this embodiment of the present invention, it can be learned, from step 202, that the terminal may communicate with the gateway by way of the first base station, that the terminal may receive downlink data from the gateway by way of the first base station, and that the terminal may also send uplink data to the gateway by way of the first base station. Because the terminal is mobile, the terminal may move when the terminal communicates with the gateway. For example, the terminal moves from the first base station to the second base station. In this embodiment of the present invention, the controller first determines that the terminal has entered a coverage area of the second base station, and then the controller also sends, to the second base station, the radio identifier and the control channel resource that are configured by the controller and that have been sent to the terminal. For example, the controller obtains, from the resource pool, the radio identifier and the control channel resource of the terminal that are allocated to the second base station, and sends the radio identifier and the control channel resource of the terminal to the second base station. To avoid a control channel collision caused when both the first base station and the second base station schedule the terminal, the control channel resources sent by the controller to the first base station and the second base station respectively do not collide. For example, the control channel resources sent by the controller to the first base station and the second base station may be frequency division multiplexed. In addition, in some embodiments of the present invention, a connection is established between the controller and a gateway. The controller may obtain transmission configuration information of the gateway. The controller may further send the transmission configuration information of the gateway to the second base station. In this case, the gateway and the second base station may establish a transmission path between the gateway and the second base station. For a process of establishing a transmission path between the gateway and the second base station, refer to the prior art, and details are not described herein.

In this embodiment of the present invention, a transmission path is established between the gateway and the second base station, and the second base station has obtained the control channel resource allocated by the controller. Therefore, the second base station may send control signaling to the terminal by using the control channel resource. The control signaling may be scheduling information of the shared channel, and is used to instruct the terminal to transmit data on the shared channel.

In this embodiment of the present invention, the terminal moves from the first base station to the second base station, and because the terminal has received the radio identifier and the control channel resource of the terminal from the controller during initial access, the terminal is unaware of the move from the first base station to the second base station. The controller may determine whether the terminal has entered the coverage area of the second base station, and after the terminal enters the coverage area of the second base station, the controller may further trigger the gateway to establish the transmission path between the gateway and the second base station. After establishment of the transmission path is complete, the transmission path may be used for the terminal and the gateway to communicate by way of the second base station.

In this embodiment of the present invention, the controller may be an independent control device in the mobile network. Connections are established both between the controller and the first base station and between the controller and the second base station. For example, the controller may be deployed on the macro base station shown in FIG. 1-$a$, or the controller may be the controller shown in FIG. 1-$b$. In some other embodiments of the present invention, a control function of the controller may be implemented by the first base station, that is, the first base station may send the radio identifier and the control channel resource of the terminal to the terminal. In some other embodiments of the present invention, the controller may be a distributed controller, that is, the distributed controller may be deployed on the first base station or the second base station. Specifically, when the terminal is located in the coverage area of the first base station, a control function of the controller is implemented by the first base station, and when the terminal is located in the coverage area of the second base station, the control function of the controller is implemented by the second base station. In this way, the control function of the controller may be implemented by a base station whose coverage area the terminal is located in. Therefore, the control function of the controller may move. When the terminal is handed over from the first base station to the second base station, the first base station may send a controller move instruction to the second base station. The controller move instruction includes configuration context of the terminal. For example, the configuration context of the terminal may include the radio identifier information of the terminal and radio configuration information of the terminal. The configuration context of the terminal may be configured flexibly as required in different implementations, and is not limited specifically herein.

It should be noted that, in this embodiment of the present invention, the second base station is a base station, other than the first base station, in a pre-set range around a position of the terminal. For example, the second base station may be a neighboring base station near the first base station, or the second base station may be a surrounding base station determined according to the position of the terminal. Because the terminal always moves from the first base station in which the terminal is located to a neighboring base station of the first base station during movement, when the terminal initially accesses the network, the controller configures, for the terminal, configuration information of all base stations to which the terminal may be handed over and control channel resources that may be used by these base station. In this case, the terminal can obtain configuration and resource usage of all the base station near the position of the terminal, and the terminal does not need to obtain a new control channel resource even when the terminal moves and is handed over from one base station to another base station.

In some embodiments of the present invention, that the controller determines that the terminal is located in a coverage area of a second base station in step 203 may include:

A1. The controller receives a measurement report that comes from the terminal and that is forwarded by a base station, where the measurement report that comes from the terminal is sent by the terminal when the terminal performs channel measurement according to measurement configuration information provided by the controller and the terminal determines that a radio signal measurement quantity between the second base station and the terminal meets a pre-set first channel condition; and the controller determines, according to the measurement report sent by the terminal, that the terminal is located in the coverage area of the second base station; or, A2. The controller receives a first measurement report sent by the base station, where the first measurement report sent by the base station is sent when the base station determines, according to a measurement result sent by the terminal, that a radio signal measurement quantity between the base station and the terminal meets a pre-set second channel condition, and the measurement result sent by the terminal is generated after the terminal performs channel measurement according to measurement configuration information provided by the controller; and the controller determines, according to the measurement report sent by the base station, that the terminal is located in the coverage area of the second base station; or, A3. The controller receives a measurement result sent by the base station, where the measurement result sent by the base station is generated after the base station performs channel measurement on a position tracking signal sent by the terminal; and the controller determines, according to the measurement result sent by the base station, that a radio signal measurement quantity between the second base station and the terminal meets a pre-set third channel condition, and determines that the terminal is located in the coverage area of the second base station; or, A4. The controller receives a second measurement report sent by the base station, where the second measurement report sent by the base station is sent when the base station performs channel measurement on a position tracking signal sent by the terminal and determines that a radio channel measurement quantity between the base station and the terminal meets a pre-set fourth channel condition; and the controller determines, according to the measurement report sent by the base station, that the terminal is located in the coverage area of the second base station.

The base station is the first base station and/or the second base station.

Next, detailed descriptions are provided, respectively, for the several possible implementations that are recorded in step A1, step A2, step A3, and step A4 and in which the controller determines that the terminal is located in the coverage area of the second base station.

In step A1, the controller provides the measurement configuration information, and the terminal may perform channel measurement according to the measurement configuration information; then the terminal performs determining on the radio signal measurement quantity between the second base station and the terminal to determine whether the radio signal measurement quantity between the second base station and the terminal meets a pre-set first channel condition; when the radio signal measurement quantity between the second base station and the terminal meets the first channel condition, the terminal sends the measurement report to the base station (that is, the first base station and/or the second base station), where the measurement report may be specifically channel quality indicator (CQI) measurement information; the controller forwards the received measurement report to the controller; and the controller may determine, according to the measurement report sent by the terminal, that the terminal is located in the coverage area of the second base station. Specific configuration of the first channel condition may be implemented with reference to a specific application scenario, and is not limited herein.

In step A2, the controller provides the measurement configuration information, and the terminal may perform channel measurement according to the measurement configuration information; the terminal sends the measurement result to the base station (for example, may be the first base station and/or the second base station); and after receiving the measurement result sent by the terminal, the base station may perform determining on the radio signal measurement quantity between the base station and the terminal to determine whether the radio signal measurement quantity between the base station and the terminal meets a pre-set second channel condition. For example, the first base station may perform determining on a radio signal measurement quantity between the first base station and the terminal, or the second base station may perform determining on a radio signal measurement quantity between the second base station and the terminal. When the radio signal measurement quantity between the base station and the terminal meets the second channel condition, the base station sends the measurement report to the controller, and the controller may determine, according to the measurement report sent by the base station, that the terminal is located in the coverage area of the second base station. Specific configuration of the second channel condition may be implemented with reference to a specific application scenario, and is not limited herein.

In step A3, the terminal sends the position tracking signal. The position tracking signal may be specifically a sounding reference signal (SRS) or a discovery signal. The base station may perform channel measurement on the position tracking signal sent by the terminal and generates the measurement result, the base station sends the measurement result to the controller, the controller performs determining on the radio signal measurement quantity between the second base station and the terminal according to the measurement result generated by the base station to determine whether the radio signal measurement quantity between the second base station and the terminal meets the pre-set third channel condition, and when the radio signal measurement quantity between the second base station and the terminal meets the third channel condition, the controller determines that the terminal is located in the coverage area of the second base station. Specific configuration of the third channel condition may be implemented with reference to a specific application scenario, and is not limited herein.

In step A4, the terminal sends the position tracking signal, the base station may perform channel measurement on the position tracking signal sent by the terminal and generates the measurement result, and the base station performs determining on the radio signal measurement quantity between the base station and the terminal according to the measurement result to determine whether the radio signal measurement quantity between the base station and the terminal meets a pre-set fourth channel condition. For example, the first base station may perform determining on a radio signal measurement quantity between the first base station and the terminal, or the second base station may perform determining on a radio signal measurement quantity between the second base station and the terminal. When the radio signal measurement quantity between the base station and the terminal meets the fourth channel condition, the base station sends the measurement report to the controller, and the controller may determine, according to the measurement report sent by the base station, that the terminal is located in the coverage area of the second base station. Specific configuration of the fourth channel condition may be implemented with reference to a specific application scenario, and is not limited herein.

In some embodiments of the present invention, the terminal handover method provided in the present invention may further include the following steps.

B1. The controller receives data transmission status information sent by a gateway, where the data transmission status information includes at least one piece of the following information: a status of data transmission between the gateway and the first base station or a status of data transmission between the gateway and the second base station.

B2. When the controller determines that the status of data transmission between the gateway and the first base station does not meet a pre-set transmission condition, the controller sends a teardown instruction to the gateway or the first base station, so that the gateway or the first base station tears down a transmission path between the gateway and the first base station.

The gateway and the terminal may transmit data simultaneously by way of the first base station and the second base station. In the data transmission process, the gateway may further report the data transmission status information to the controller. The data transmission status information may indicate a current traffic volume, a data transmission rate, a data buffer size, or the like. The controller may determine, according to the data transmission status information, that a data transmission status of which link does not meet a pre-set transmission condition. For example, after the terminal is handed over from the first base station to the second base station, a volume of data transmitted between the terminal and the gateway by way of the first base station is reduced, or no data is transmitted. In this case, the status of data transmission between the gateway and the first base station does not meet the pre-set transmission condition, and the controller sends the path teardown instruction to the gateway or the first base station, so that the gateway or the first base station tears down the transmission path between the gateway and the first base station. Data transmission efficiency can be improved by tearing down the idle transmission path.

From the descriptions of the present invention in the foregoing example, it can be learned that the controller configures the radio identifier and the control channel resource of the terminal, the controller sends the radio identifier and the control channel resource of the terminal that are configured to the terminal, when the terminal is located in the coverage area of the first base station, the controller sends the radio identifier and the control channel resource of the terminal to the first base station, the controller determines that the terminal is located in the coverage area of the second base station, and then the controller sends the radio identifier and the control channel resource of the terminal to the second base station, so that the control signaling separately sent from the first base station and the second base station by using the control channel resource is received by the terminal. In this embodiment of the present invention, the controller allocates, to the terminal, the terminal identifier and the control channel resource that can be used by the terminal in both the first base station and the second base station to which the terminal is handed over; when the terminal is located in the coverage area of the first base station, the controller also sends the radio identifier and the control channel resource that are configured for the terminal to the first base station, the controller determines that the terminal is located in the coverage area of the second base station, and the controller also sends the radio identifier and the control channel resource that are configured for the terminal to the second base station. Therefore, when the terminal moves between base stations such as the first base station and the second base station, the terminal can always use the radio identifier and the control channel resource that are configured by the controller, and re-configuration is not required. In this way, re-configuration signalling can be saved, data transmission is not interrupted when the terminal is handed over from the first base station to the second base station, and data transmission efficiency is quite high.

Figure 3:
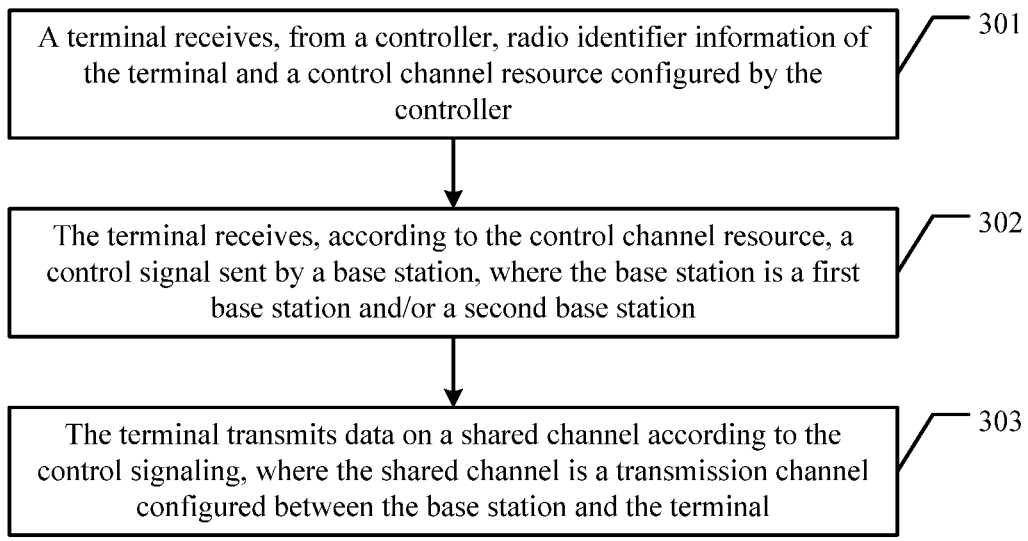
FIG. 3 is a schematic block diagram of a procedure of another terminal handover method according to an embodiment of the present invention.

The foregoing embodiment describes the terminal handover method provided in the embodiments of the present invention in respective of a controller side. The following describes the terminal handover method provided in the embodiments of the present invention in respective of a terminal side. As shown in FIG. 3, a terminal handover method provided in this embodiment of the present invention may include the following steps.

301. A terminal receives, from a controller, radio identifier information of the terminal and a control channel resource configured by the controller.

In this embodiment of the present invention, the controller may allocate a resource pool to the terminal, and the controller sends the radio identifier information of the terminal and the control channel resource configured by the controller to the terminal. For example, the controller may send user plane node configuration information to the terminal. Then, the terminal may obtain, according to the user plane node configuration information, the radio identifier information of the terminal and the control channel resource configured by the controller. The radio identifier information of the terminal may be specifically a cell radio network temporary identifier (CRNTI) of the terminal, or may be another identifier of the terminal, and is not limited herein.

In this embodiment of the present invention, the controller may be an independent control device in the mobile network. Connections are established both between the controller and the first base station and between the controller and the second base station. For example, the controller may be deployed on the macro base station shown in FIG. 1-a, or the controller may be the controller shown in FIG. 1-b. In some other embodiments of the present invention, a control function of the controller may be implemented by the first base station, that is, the first base station may send the radio identifier and the control channel resource of the terminal to the terminal. In some other embodiments of the present invention, the controller may be a distributed controller, that is, the distributed controller may be deployed on the first base station or the second base station. Specifically, when the terminal is located in the coverage area of the first base station, a control function of the controller is implemented by the first base station, and when the terminal is located in the coverage area of the second base station, the control function of the controller is implemented by the second base station. In this way, the control function of the controller may be implemented by a base station whose coverage area the terminal is located in. Therefore, the control function of the controller may move. When the terminal is handed over from the first base station to the second base station, the first base station may send a controller move instruction to the second base station. The controller move instruction includes configuration context of the terminal. For example, the configuration context of the terminal may include the radio identifier information of the terminal and radio configuration information of the terminal. The configuration context of the terminal may be configured flexibly as required in different implementations, and is not limited specifically herein.

In some embodiments of the present invention, the terminal handover method provided in the present invention may further include one of the following steps.

C1. The terminal performs channel measurement according to measurement configuration information provided by the controller, determines, according to a generated measurement result, whether a radio signal measurement quantity between the second base station and the terminal meets a pre-set first channel condition, and when the radio signal measurement quantity between the second base station and the terminal meets the pre-set first channel condition, the terminal sends a measurement report to the controller by way of the base station.

C2. The terminal performs channel measurement according to measurement configuration information provided by the controller, and sends a measurement result generated by the terminal to the base station.

C3. The terminal sends a position tracking signal according to signal configuration information provided by the controller.

In step C1, the controller provides the measurement configuration information, and the terminal may perform channel measurement according to the measurement configuration information; then the terminal performs determining on the radio signal measurement quantity between the second base station and the terminal to determine whether the radio signal measurement quantity between the second base station and the terminal meets the pre-set first channel condition; when the radio signal measurement quantity between the second base station and the terminal meets the first channel condition, the terminal sends the measurement report to the base station (that is, the first base station and/or the second base station), where the measurement report may be specifically CQI measurement information; and the base station forwards the received measurement report to the controller.

In step C2, the controller provides the measurement configuration information, and the terminal may perform channel measurement on the measurement configuration information; and then the terminal sends the measurement result to the base station (for example, the base station may be the first base station and/or the second base station).

In step C3, the controller provides the signal configuration information, and the terminal may send the position tracking signal. The position tracking signal may be specifically an SRS or discovery signal.

302. The terminal receives, according to the control channel resource, a control signal sent by a base station, where the base station is a first base station and/or a second base station.

In this embodiment of the present invention, when the terminal is located in the coverage area of the first base station, a gateway establishes a transmission path between the gateway and the first base station. As the terminal moves from the first base station to the second base station, the gateway may establish a transmission path between the gateway and the second base station after the controller determines that the terminal has entered a coverage area of the second base station. Both the first base station and the second base station may send control signaling by using the control channel resource allocated by the controller from the resource pool, as long as the control channel resources used by the two base stations do not collide. This implements simultaneous scheduling by the two base stations for the terminal. For example, the controller may allocate different control channel resources to the first base station and the second base station; therefore, there is no control channel resource collision. After the terminal receives the control signalling sent by the base station, subsequent step 303 is performed.

303. The terminal transmits data on a shared channel according to the control signalling, where the shared channel is a transmission channel configured between the base station and the terminal.

In this embodiment of the present invention, it can be learned, from step 302, that the terminal may obtain scheduling information of the shared channel between the base station and the terminal from the base station according to the control signalling; and the terminal may transmit data on the shared channel between the base station and the terminal. For example, in some embodiments of the present invention, that the terminal transmits data on a shared channel according to the control signaling in step 303 may specifically include both or one of the following steps.

D1. The terminal receives, on the shared channel, downlink data sent by the first base station and/or the second base station.

D2. The terminal sends uplink data to the first base station and/or the second base station on the shared channel.

That is, the transmitting data in this embodiment of the present invention may be at least one of receiving downlink data by the terminal or sending uplink data by the terminal, and specific implementation depends on which base station sends the control signaling and resource scheduling indicated by the control signalling.

From the descriptions of the present invention in the foregoing example, it can be learned that, in this embodiment of the present invention, the controller allocates, to the terminal, the terminal identifier and the control channel resource that can be used by the terminal in both the first base station and the second base station to which the terminal is handed over; when the terminal is located in the coverage area of the first base station, the controller also sends the radio identifier and the control channel resource that are configured for the terminal to the first base station, the controller determines that the terminal is located in the coverage area of the second base station, and the controller also sends the radio identifier and the control channel resource that are configured for the terminal to the second base station. Therefore, when the terminal moves between base stations such as the first base station and the second base station, the terminal can always use the radio identifier and the control channel resource that are configured by the controller, and re-configuration is not required. In this way, re-configuration signalling can be saved, data transmission is not interrupted when the terminal is handed over from the first base station to the second base station, and data transmission efficiency is quite high.

Figure 4:
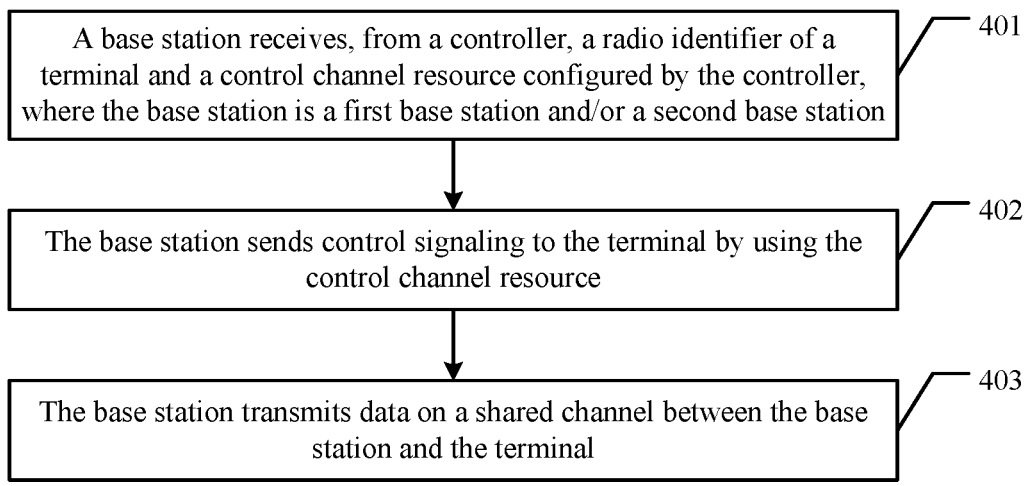
FIG. 4 is a schematic block diagram of a procedure of another terminal handover method according to an embodiment of the present invention.

The foregoing embodiments describe the terminal handover method provided in the embodiments of the present invention in respective of the controller side and the terminal side. The following describes the terminal handover method provided in the embodiments of the present invention in respective of a side of a base station in which a terminal is located. As shown in FIG. 4, a terminal handover method provided in this embodiment of the present invention may include the following steps.

401. A base station receives, from a controller, a radio identifier of a terminal and a control channel resource configured by the controller, where the base station is a first base station and/or a second base station.

In this embodiment of the present invention, the controller may allocate a resource pool to the terminal, and the controller sends the radio identifier information of the terminal and the control channel resource configured by the controller to the terminal. When the terminal enters a coverage area of the first base station, the controller may send the radio identifier information of the terminal and the control channel resource configured by the controller to the first base station. When the terminal enters a coverage area of the second base station, the controller may send the radio identifier information of the terminal and the control channel resource configured by the controller to the second base station. A connection is established between the controller and a gateway, and the controller may obtain transmission configuration information of the gateway. For example, the transmission configuration information may include an IP address of the gateway and tunnel information of the gateway. The controller sends the transmission configuration information of the gateway to the first base station. Then the gateway may establish a transmission path between the gateway and the first base station. For a process of establishing a transmission path by the gateway, refer to the prior art, and details are not described herein. The controller may further send the transmission configuration information of the gateway to the second base station. Then the gateway may establish a transmission path between the gateway and the second base station.

In some embodiments of the present invention, the terminal handover method provided in the present invention may further include one of the following steps.

E1. The base station receives a measurement report sent by the terminal, where the measurement report sent by the terminal is sent by the terminal when the terminal performs channel measurement according to measurement configuration information provided by the controller and determines that a radio signal measurement quantity between the second base station and the terminal meets a pre-set first channel condition; and forwards, to the controller, the measurement report sent by the terminal.

E2. The base station receives a measurement result sent by the terminal, where the measurement result sent by the terminal is generated after the terminal performs channel measurement according to measurement configuration information provided by the controller; and sends a measurement report to the controller when the base station determines, according to the measurement result, that a radio signal measurement quantity between the base station and the terminal meets a pre-set second channel condition.

E3. The base station generates a measurement result after performing channel measurement on a position tracking signal sent by the terminal, and sends the measurement result generated by the base station to the controller.

E4. The base station performs channel measurement on a position tracking signal sent by the terminal, and sends a measurement report generated by the base station to the controller when the base station determines that a radio channel measurement quantity between the base station and the terminal meets a pre-set fourth channel condition.

Next, detailed descriptions are provided, respectively, for the several possible implementations that are recorded in step E1, step E2, step E3, and step E4 and in which the controller determines that the terminal is located in the coverage area of the second base station.

In step E1, the controller provides the measurement configuration information, and the terminal may perform channel measurement according to the measurement configuration information; then the terminal performs determining on the radio signal measurement quantity between the second base station and the terminal to determine whether the radio signal measurement quantity between the second base station and the terminal meets the pre-set first channel condition; when the radio signal measurement quantity between the second base station and the terminal meets the first channel condition, the terminal sends the measurement report to the base station (that is, the first base station and/or the second base station); and the base station forwards the received measurement report to the controller.

In step E2, the controller provides the measurement configuration information, and the terminal may perform channel measurement according to the measurement configuration information; the terminal sends the measurement result to the base station (for example, the base station may be the first base station and/or the second base station); and after receiving the measurement result sent by the terminal, the base station may perform determining on the radio signal measurement quantity between the base station and the terminal to determine whether the radio signal measurement quantity between the base station and the terminal meets a pre-set second channel condition. For example, the first base station may perform determining on a radio signal measurement quantity between the first base station and the terminal, or the second base station may perform determining on a radio signal measurement quantity between the second base station and the terminal. When the radio signal measurement quantity between the base station and the terminal meets the pre-set second channel condition, the base station sends the measurement report to the controller.

In step E3, the terminal sends the position tracking signal, the base station may perform channel measurement on the position tracking signal sent by the terminal and generates the measurement result; and the base station sends the measurement result to the controller. Specific configuration of the third channel condition may be implemented with reference to a specific application scenario, and is not limited herein.

In step E4, the terminal sends the position tracking signal, the base station may perform channel measurement on the position tracking signal sent by the terminal and generates the measurement result, and the base station performs determining on the radio signal measurement quantity between the base station and the terminal according to the measurement result to determine whether the radio signal measurement quantity between the base station and the terminal meets a pre-set fourth channel condition. For example, the first base station may perform determining on a radio signal measurement quantity between the first base station and the terminal, or the second base station may perform determining on a radio signal measurement quantity between the second base station and the terminal. When the radio signal measurement quantity between the base station and the terminal meets the fourth channel condition, the base station sends the measurement report to the controller. Specific configuration of the fourth channel condition may be implemented with reference to a specific application scenario, and is not limited herein.

402. The base station sends control signaling to the terminal by using the control channel resource.

In this embodiment of the present invention, after the base station receives, from the controller, the control channel resource allocated to the terminal by the controller, the base station may send the control signaling to the terminal by using the control channel resource. The control signaling may be scheduling information of a shared channel, and is used to instruct the terminal to transmit data on the shared channel.

403. The base station transmits data on a shared channel between the base station and the terminal.

In this embodiment of the present invention, a shared channel is established between the base station and the terminal. The shared channel is used to transmit data. The transmitting data in this embodiment of the present invention may be at least one of receiving downlink data by the terminal or sending uplink data by the terminal, and specific implementation depends on the control signaling sent by the base station.

In some embodiments of the present invention, when the base station is the first base station, a control function of the controller is implemented by the first base station; or when the terminal is located in a coverage area of the first base station, a control function of the controller is implemented by the first base station, and when the terminal is located in a coverage area of the second base station, the first base station sends a control function move instruction to the second base station. The control function move instruction includes configuration context of the terminal.

In this embodiment of the present invention, the controller may be an independent control device in the mobile network. Connections are established both between the controller and the first base station and between the controller and the second base station. For example, the controller may be deployed on the macro base station shown in FIG. 1-a, or the controller may be the controller shown in FIG. 1-b. In some other embodiments of the present invention, a control function of the controller may be implemented by the first base station, that is, the first base station may send the radio identifier and the control channel resource of the terminal to the terminal. In some other embodiments of the present invention, the controller may be a distributed controller, that is, the distributed controller may be deployed on the first base station or the second base station. Specifically, when the terminal is located in the coverage area of the first base station, a control function of the controller is implemented by the first base station, and when the terminal is located in the coverage area of the second base station, the control function of the controller is implemented by the second base station. In this way, the control function of the controller may be implemented by a base station whose coverage area the terminal is located in. Therefore, the control function of the controller may move. When the terminal is handed over from the first base station to the second base station, the first base station may send a controller move instruction to the second base station. The controller move instruction includes configuration context of the terminal. For example, the configuration context of the terminal may include the radio identifier information of the terminal and radio configuration information of the terminal. The configuration context of the terminal may be configured flexibly as required in different implementations, and is not limited specifically herein.

From the descriptions of the present invention in the foregoing example, it can be learned that, in this embodiment of the present invention, the controller allocates, to the terminal, the terminal identifier and the control channel resource that can be used by the terminal in both the first base station and the second base station to which the terminal is handed over; when the terminal is located in the coverage area of the first base station, the controller also sends the radio identifier and the control channel resource that are configured for the terminal to the first base station, the controller determines that the terminal is located in the coverage area of the second base station, and the controller also sends the radio identifier and the control channel resource that are configured for the terminal to the second base station. Therefore, when the terminal moves between base stations such as the first base station and the second base station, the terminal can always use the radio identifier and the control channel resource that are configured by the controller, and re-configuration is not required. In this way, re-configuration signaling can be saved, data transmission is not interrupted when the terminal is handed over from the first base station to the second base station, and data transmission efficiency is quite high.

For better understanding and implementation of the foregoing solution according to the embodiment of the present invention, the following provides detailed descriptions by using corresponding application scenarios as an example.

Referring to FIG. 5-*a* and FIG. 5-*b*, FIG. 5-*a* and FIG. 5-*b* are schematic diagrams of two application scenarios of the terminal handover method provided in the embodiments of the present invention. The following separately provide descriptions by using examples. Referring to FIG. 5-*a*, in this example, a terminal is specifically UE, a first base station is specifically a user plane node 1 (UP node 1), a second base station is specifically a user plane node 2 (UP node 2), and a gateway is specifically a user plane gateway (UP GW). The terminal may access a network by using any radio access node. The terminal accesses the network over an air interface after camping on a cell served by a small cell base station in FIG. 1-*a*, a cell served by the macro base station in FIG. 1-*a*, or a cell served by a small cell in FIG. 1-*b*. After procedures such as authentication and service requesting, the following steps are performed.

S01. A controller sends user plane node configuration information to the UP node 1.

S02. The controller sends a radio resource control (RRC) re-configuration command to the UE.

S03. The UP GW sends downlink data to the UP node 1, and the UP node 1 sends an enhanced physical downlink control channel (EPDCCH) or a physical downlink shared channel (PDSCH) to the UE.

S04. The controller determines that the UE has entered a coverage area of the UP node 2 by using at least one of the following three move criteria.

ALT1. The UE sends a measurement report to the controller.

ALT2. The UP node 1 sends a measurement report to the controller.

ALT3. The UP node 2 sends a measurement report to the controller.

S05. The controller allocates a control channel resource from a resource pool to the UP node 1.

S06. The controller allocates a control channel resource from a resource pool to the UP node 2.

S07. The controller sends a data stream allocation request to the UP GW.

S08. The UP GW divides a data stream into two parts: One part is sent to the UE by the UP node 1, and the other part is sent to the UE by the UP node 2.

S09. The UP GW sends data transmission status information to the controller.

S10. The controller sends a user plane node removal instruction to the UP node 1.

S11. The UP node 1 sends a data return instruction to the UP GW.

In step S01 to step S11, the controller allocates one resource pool to the terminal for use. The resource pool is effective within a plurality of base stations or a plurality of cells. Therefore, when moving between these base stations or cells, the terminal may always use one resource pool, and re-configuration is not required. In this way, re-configuration signalling can be saved; the terminal does not need to wait for configuration for the terminal by a new cell when moving from one base station to another base station or from one cell to another cell, and this may be transparent or imperceptive for the terminal. In the two typical scenarios in FIG. 1-*a* and FIG. 1-*b*, same or similar common configurations may be used when small cells are deployed in one area. For example, these configurations may be managed by the controller. As shown in the scenario shown in FIG. 1-*a*, the macro base station may broadcast common configuration information of small cells. Therefore, the terminal may obtain a configuration of a small cell from the macro base station, the terminal may obtain common configuration information shared by a plurality of small cells from the macro base station, and different configuration information may be broadcast by cells served by the small cells, or may be broadcast also by the macro base station. The terminal may distinguish between the different common configuration information by using identifier information of the small cells or cells. In the scenario shown in FIG. 1-*b*, because the controller has no radio transmission capability, common configurations of the small cells need to be sent over radio air interfaces of all base stations, and multiple base stations may perform synchronization over air interfaces and use a same cell identifier. Similar to the macro base station in FIG. 1-*a*, multiple base stations send common configuration information of the small cells synchronously. The terminal may obtain configuration information from any small cell or a cell served by a small cell.

In step S01 to step S11, the controller configures the radio identifier information, for example, a C-RNTI, of the terminal by using a dedicated signaling configuration, for example, an RRC configuration message, to allocate a resource pool to the terminal. A downlink control channel resource in the resource pool may be an EPDCCH resource. The resource pool may further include an uplink control channel resource, for example, an enhanced physical uplink control channel (EPUCCH). The resource pool may further include uplink and downlink shared data channel configurations, for example, a time-frequency resource location. The controller perform sending to the terminal over an air interface, in the scenario in FIG. 1-*a*, the resource pool is sent by the macro base station, and in FIG. 1-*b*, the resource pool is sent to the terminal by a small cell accessed by the terminal or a small cell near the terminal. Simultaneously, the controller notifies the small cell in which the terminal is located of the configuration, and may also notify some small cells surrounding the controller of the configuration. For example, during downlink scheduling, as described in FIG. 5-*a*, a small cell, namely, the UP node 1, sends downlink control signaling to the terminal by using the downlink control channel resource in the resource pool. For example, scheduling information used to send downlink or uplink shared data channel is used to instruct the terminal to receive or send data on the shared data channel.

When the terminal moves to a border of the UP node 1 and the UP node 2, the controller uses the following manners to determine that the terminal has entered the coverage area of the UP node 2.

Option 1: When learning, by means of measurement according to a measurement report configured by the controller, that a measurement quantity of a radio signal from the UP node 2 meets a signal strength threshold, for example, when the measurement quantity of the radio signal from the UP node 2 is greater than a measurement quantity of a radio signal from the UP node 1 which is 3 dB, the terminal reports a measurement result to the controller. In the scenario in FIG. 1-*b*, the measurement report is forwarded to the controller by the small cell, namely, the UP node 1.

Option 2: The UP node 1 may notify the controller over an interface between base stations according to CQI measurement information reported by the terminal or that CQI measurement information of the terminal with respective to the UP node 2 is greater than a channel quality threshold. The terminal may send the CQI measurement information within the uplink control channel resource, and the UP node 1 and the UP node 2 listen to and receive.

Option 3: The UP node 2 notifies the controller over an interface between base stations when determining, according to an SRS signal or a discovery signal, that the terminal is approaching the UP node 2, where the SRS signal or the discovery signal is sent by the terminal. To avoid that all UP nodes need to blindly detect all terminals, the controller may control a specified UP node to detect some terminals. For example, the controller may instruct a base station adjacent to a base station in which the terminal is located to detect the terminal.

The controller may use the foregoing manners to determine whether the terminal has entered the coverage area of the UP node 2 and whether data can be transmitted by the UP node 2. The controller may separately allocate, to the UP node 1 and the UP node 2, a downlink control channel resource in the resource pool dedicated for the terminal. For example, the downlink control channel resource in the resource pool may be divided into two parts: One part is for use by the UP node 1 and the other part is for use by the UP node 2, so as to avoid a downlink control channel collision caused when the two UP nodes schedule one terminal simultaneously. Configuration information may be notified to an UP node over an interface between base stations, and simultaneously, a user plane gateway is instructed to offload a part of data onto the UP node 2. To ensure that the UP node 2 and the user plane gateway can communicate with each other, notification information may carry transmission configuration information, for example, an IP address and tunnel information, of the UP node 2. The configuration information sent to the UP node before carries transmission configuration information of the user plane gateway, so as to establish a transmission path between the UP node and the user plane gateway. In the foregoing manners, the controller may manage a resource pool that is dedicated for the terminal and shared by a plurality of UP nodes. If there are more UP nodes, a quantity of resources in the dedicated resource pool may be increased by using an air interface configuration message. Therefore, when receiving the resource pool, the terminal may simultaneously receive scheduling information from the plurality of UP nodes and perform transmission with the plurality of UP nodes. The plurality of UP nodes may share same UE-related configuration information; therefore, the UE does not need to distinguish between control information received by different UP nodes. The terminal implements transmission of data with the user plane gateway by way of the plurality of UP nodes. The user plane gateway may allocate data traffic to different links according to stream control information. The user plane gateway may further exchange data transmission status information with the controller. When there is no data over a link for a long time or the terminal moves out of a coverage area of an UP node according to mobility, the controller may instruct the user plane gateway to tear down the link, and data that has not been transmitted by the UP node is returned to the user plane gateway. The user plane gateway and the controller may be separate nodes or may be one node. When the user plane gateway and the controller are one node, an interface between the user plane gateway and the controller is an internal interface and belongs to internal implementation.

Next, referring to FIG. 5-*b*, in this example, a terminal is specifically UE, a first base station is specifically an UP node 1, a second base station is specifically an UP node 2, and a gateway is specifically an UP GW. In the scenario shown in FIG. 5-*a*, the controller is specifically a distributed controller, and the controller may be deployed in any small cell. When the terminal performs initial access, the controller is located in an initially accessed small cell, namely, the UP node 1. The terminal may access a network by using any radio access node. The terminal accesses the network over an air interface after camping on a cell served by a small cell in FIG. 1-*a*, a cell served by the macro base station in FIG. 1-*a*, or a cell served by a small cell in FIG. 1-*b*. After procedures such as authentication and service requesting, the following steps are performed.

P01. The UP node 1 sends an RRC re-configuration command to the UE.

P02. The UP GW sends downlink data to the UP node 1, and the UP node 1 sends an EPDCCH or a PDSCH to the UE.

P03. The UP node 1 uses at least one of the following move criteria to determine that the UE has entered a coverage area of the UP node 2.

ALT1. The UE sends a measurement report to the UP node 1.

ALT2. The UP node 1 itself generates a measurement report.

ALT3. The UP node 2 sends a measurement report to the UP node 1.

P04. The UP node 1 allocates a control channel resource from a resource pool to the UP node 2.

P05. The UP node 2 sends acknowledgment information to the UP node 1.

P06. The UP node 1 sends a data stream allocation request to the UP GW.

P07. The UP GW divides a data stream into two parts: One part is sent to the UE by the UP node 1, and the other part is sent to the UE by the UP node 2.

P09. The UP node 1 sends a controller move instruction to the UP node 2.

P10. The UP node 2 sends a controller move response to the UP node 1.

In step P01 to step P10, the UP node 1 configures an RRC configuration message for the terminal, and allocates radio identifier information, for example, a C-RNTI, of the terminal, to allocate a resource pool for the terminal. A downlink control channel resource in the resource pool may be an EPDCCH resource. The resource pool may further include an uplink control channel resource, for example, an EPUCCH. The resource pool may further include uplink and downlink shared data channel configurations, for example, a time-frequency resource location. The controller sends the resource pool to the terminal over an air interface. The resource pool is sent by the macro base station in the scenario in FIG. 1-*a*, and in FIG. 1-*b*, is sent to the terminal by a small cell accessed by the terminal or a small cell near the terminal. As a controller, the UP node 1 may obtain the resource pool configuration of the terminal from a resource management node. A management scope of the resource management node is similar to that of the controller in FIG. 5-*a*.

When the terminal moves to a border of the UP node 1 and the UP node 2, the UP node 1 may determine, in the following manners similar to that shown in FIG. 5-*b*, that the terminal has entered the coverage area of the UP node 2.

Option 1: When learning, by means of measurement according to a measurement report configured by the controller, that a measurement quantity of a radio signal from the UP node 2 meets a signal strength threshold, for example, when the measurement quantity of the radio signal from the UP node 2 is greater than a measurement quantity of a radio signal from the UP node 1 which is 3 dB, the terminal reports a measurement report to notify the controller, namely, the UP node 1.

Option 2. The UP node 1 may notify the controller over an interface between base stations according to CQI measurement information reported by the terminal or that CQI information of the terminal with respective to the UP node 2 is greater than a channel quality threshold. The terminal may send the CQI measurement information within the foregoing uplink control channel resource, and the UP node 1 listens to and receives the CQI measurement information.

Option 3: The UP node 2 notifies the controller through an interface between base stations when determining, according to an uplink signal sent by the terminal, for example, an SRS or a discovery signal, that the terminal is approaching the UP node 2, where the SRS or the discovery signal may be sent by the terminal within the uplink control channel resource. To avoid that all UP nodes need to blindly detect all terminals, the controller may control a specified UP node to detect some terminals. For example, the controller may instruct a base station adjacent to a base station in which the terminal is located to detect the terminal. In this embodiment, the UP node 1 may detect the terminal by using a neighboring UP node. A notification message carries feature information of an uplink signal of the terminal, for example, sequence information or identifier information of the uplink signal.

The UP node 1 may use the foregoing manners to determine whether the terminal has entered the coverage area of the UP node 2 and whether data can be transmitted by the UP node 2. The UP node 1 separately allocates, to the UP node 1 and the UP node 2, a resource in a resource pool dedicated for the terminal. For example, the resource pool may be divided two parts: One part is for use by the UP node 1, and the other part is for use by the UP node 2, so as to avoid a control channel collision caused when the two UP nodes schedule one terminal simultaneously. Configuration information may be notified to an UP node over an interface between base stations. Simultaneously, the UP node 1 instructs the user plane gateway to offload a part of data onto the UP node 2. To ensure that the UP node 2 and the user plane gateway can communicate with each other, notification information may carry transmission configuration information, for example, an IP address and tunnel information, of the UP node 2. The configuration information sent to the UP node before carries transmission configuration information of the user plane gateway, so as to establish a transmission path between the UP node and the user plane gateway. In the foregoing manners, the controller may manage a resource pool that is dedicated for the terminal and shared by a plurality of UP nodes. If there are more UP nodes, a quantity of downlink control channel resources in the dedicated resource pool may be increased by using an air interface configuration message. Therefore, when receiving the resource pool, the terminal may simultaneously receive scheduling information from the plurality of UP nodes and perform transmission with the plurality of UP nodes. The plurality of UP nodes may share same UE-related configuration information; therefore, the UE does not need to distinguish between control information received by different UP nodes. The terminal implements transmission of data with the user plane gateway by way of the plurality of UP nodes. The user plane gateway may allocate data traffic to different links according to stream control information. The user plane gateway may further exchange data transmission status information with the controller. When there is no data over a link for a long time or the terminal moves out of a coverage area of an UP node according to mobility, the controller may instruct the user plane gateway to tear down the link, and data that has not been transmitted by the UP node is returned to the user plane gateway.

A difference between FIG. 5-_b_ and FIG. 5-_a_ lies in that a controller function on an UP node can move, and when the terminal moves out of a coverage area of the UP node 1, the UP node 1 may initiate a controller move process to the UP node 2, sends configuration context of the terminal to the UP node 2, and releases use of the resource pool for the terminal. After the controller moves to the UP node 2, the UP node 2 starts a terminal move process, and the configuration context of the terminal may be deleted from the UP node 1.

From descriptions of the example of the foregoing embodiment of the present invention, it can be learned that a handover solution is improved in this embodiment of the present invention, so as to achieve a smooth terminal handover and loose coupling between nodes. This lowers a requirement on a transmission bearer between nodes, and avoids coordination between tightly coupled cells, for example, jointly-scheduled or joint-transmission cells, facilitating deployment in extensive scenarios.

It should be noted that, for ease of description, each foregoing method embodiment is described as a combination of a series of actions; however, a person skilled in the art should know that, the present invention is not limited by the described action sequence because some steps may be performed in another sequence or simultaneously according to the present invention. In addition, a person skilled in the art should also understand that all the embodiments described in this specification are used as examples, and the included actions and modules are not necessarily mandatory to the present invention.

For ease of implementing the foregoing solutions according to the embodiments of the present invention, the following further provides related apparatuses for implementing the foregoing solutions.

Referring to FIG. 6, an embodiment of the present invention provides a controller 600. The controller 600 may include a transceiver module 601 and a terminal position determining module 602.

The transceiver module 601 is configured to: send a radio identifier and a control channel resource of a terminal that are configured by the controller to the terminal; and when the terminal is located in a coverage area of a first base station, send the radio identifier and the control channel resource of the terminal to the first base station.

The terminal position determining module 602 is configured to determine that the terminal is located in a coverage area of a second base station.

The transceiver module 601 is further configured to send the radio identifier and the control channel resource of the terminal to the second base station, so that control signaling sent from the first base station and the second base station separately is received by the terminal by using the control channel resource.

In some embodiments of the present invention, the transceiver module 601 is specifically configured to send the radio identifier and the control channel resource of the terminal to a base station initially accessed by the terminal, so that the initially accessed base station sends the radio identifier and the control channel resource of the terminal to the terminal.

In some embodiments of the present invention, the transceiver module 601 is further configured to receive a measurement report that comes from the terminal and that is forwarded by a base station, where the measurement report that comes from the terminal is sent by the terminal when the terminal performs channel measurement according to measurement configuration information provided by the controller and the terminal determines that a radio signal measurement quantity between the second base station and the terminal meets a pre-set first channel condition; and the terminal position determining module 602 is specifically configured to determine, according to the measurement report sent by the terminal, that the terminal is located in the coverage area of the second base station; or the transceiver module 601 is further configured to receive a first measurement report sent by the base station, where the first measurement report sent by the base station is sent when the base station determines, according to a measurement result sent by the terminal, that a radio signal measurement quantity between the base station and the terminal meets a pre-set second channel condition, and the measurement result sent by the terminal is generated after the terminal performs channel measurement according to measurement configuration information provided by the controller; and the terminal position determining module 602 is specifically configured to determine, according to the measurement report sent by the base station, that the terminal is located in the coverage area of the second base station; or the transceiver module 601 is further configured to receive a measurement result sent by the base station, where the measurement result sent by the base station is generated after the base station performs channel measurement on a position tracking signal sent by the terminal; and the terminal position determining module 602 is specifically configured to determine, according to the measurement result sent by the base station, that a radio signal measurement quantity between the second base station and the terminal meets a pre-set third channel condition and determine that the terminal is located in the coverage area of the second base station; or the transceiver module 601 is further configured to receive a second measurement report sent by the base station, where the second measurement report sent by the base station is sent when the base station performs channel measurement on a position tracking signal sent by the terminal and determines that a radio channel measurement quantity between the base station and the terminal meets a pre-set fourth channel condition; and the terminal position determining module 602 is specifically configured to determine, according to the measurement report sent by the base station, that the terminal is located in the coverage area of the second base station.

The base station is the first base station and/or the second base station.

In some embodiments of the present invention, the transceiver module 601 is further configured to: receive data transmission status information sent by a gateway, where the data transmission status information includes at least one piece of the following information: a status of data transmission between the gateway and the first base station or a status of data transmission between the gateway and the second base station; and when the controller determines that the status of data transmission between the gateway and the first base station does not meet a pre-set transmission condition, send a teardown instruction to the gateway or the first base station, so that the gateway or the first base station tears down a transmission path between the gateway and the first base station.

In some embodiments of the present invention, a control function of the controller 600 is implemented by the first base station; or when the terminal is located in the coverage area of the first base station, a control function of the controller is implemented by the first base station, and when the terminal is located in the coverage area of the second base station, a control function of the controller is implemented by the second base station.

Referring to FIG. 7-*a*, an embodiment of the present invention provides a terminal 700. The terminal 700 may include a transceiver module 701 and a data transmission module 702.

The transceiver module 701 is configured to: receive, from a controller, a radio identifier of the terminal and a control channel resource configured by the controller; and receive, according to the control channel resource, control signaling sent by a base station. The base station is a first base station and/or a second base station.

The data transmission module 702 is configured to transmit data on a shared channel according to the control signaling. The shared channel is a transmission channel configured between the base station and the terminal.

In some embodiments of the present invention, as shown in FIG. 7-*b*, the terminal 700 further includes a measurement processing module 703.

The measurement processing module 703 is configured to: perform channel measurement according to measurement configuration information provided by the controller, and determine, according to a generated measurement result, whether a radio signal measurement quantity between the second base station and the terminal meets a pre-set first channel condition; and the transceiver module 701 is further configured to: when the radio signal measurement quantity between the second base station and the terminal meets the pre-set first channel condition, send a measurement report to the controller by way of the base station; or the measurement processing module 703 is configured to perform channel measurement according to measurement configuration information provided by the controller, and the transceiver module 701 is further configured to send a measurement result generated by the terminal to the base station; or the transceiver module 701 is further configured to send a position tracking signal according to signal configuration information provided by the controller.

In some embodiments of the present invention, the data transmission module 702 is specifically configured to: receive, on the shared channel, downlink data sent by the first base station and/or the second base station; and/or send uplink data to the first base station and/or the second base station on the shared channel.

In some embodiments of the present invention, a control function of the controller is implemented by the first base station; or when the terminal is located in a coverage area of the first base station, a control function of the controller is implemented by the first base station, and when the terminal is located in a coverage area of the second base station, a control function of the controller is implemented by the second base station.

Referring to FIG. 8-*a*, an embodiment of the present invention provides a base station 800. The base station 800 is specifically a first base station and/or a second base station, and the base station 800 includes a transceiver module 801 and a data transmission module 802.

The transceiver module 801 is configured to: receive, from a controller, a radio identifier of a terminal and a control channel resource configured by the controller; and send control signaling to the terminal by using the control channel resource.

The data transmission module 802 is configured to transmit data on a shared channel between the base station and the terminal.

In some embodiments of the present invention, as shown in FIG. 8-b, the base station 800 further includes a channel measurement module 803 and a judgment module 804.

The transceiver module 801 is further configured to: receive a measurement report sent by the terminal, where the measurement report sent by the terminal is sent by the terminal when the terminal performs channel measurement according to measurement configuration information provided by the controller and determines that a radio signal measurement quantity between the second base station and the terminal meets a pre-set first channel condition; and forward, to the controller, the measurement report sent by the terminal; or the transceiver module 801 is further configured to receive a measurement result sent by the terminal, where the measurement result sent by the terminal is generated after the terminal performs channel measurement according to measurement configuration information provided by the controller; the judgment module 804 is configured to determine, according to the measurement result, that a radio signal measurement quantity between the base station and the terminal meets a pre-set second channel condition; and the transceiver module 801 is further configured to send the measurement report to the controller; or the channel measurement module 803 is configured to generate a measurement result after performing channel measurement on a position tracking signal sent by the terminal, and the transceiver module 801 is further configured to send, to the controller, the measurement result generated by the base station; or the channel measurement module 803 is further configured to perform channel measurement on a position tracking signal sent by the terminal, the judgment module 804 is further configured to determine that a radio channel measurement quantity between the base station and the terminal meets a pre-set fourth channel condition, and the transceiver module 801 is further configured to send the measurement report generated by the base station to the controller.

In some embodiments of the present invention, when the base station is the first base station, a control function of the controller is implemented by the first base station; or when the terminal is located in a coverage area of the first base station, a control function of the controller is implemented by the first base station, and when the terminal is located in a coverage area of the second base station, the first base station sends a control function move instruction to the second base station, where the control function move instruction includes configuration context of the terminal.

An embodiment of the present invention further provides a computer storage medium. The computer storage medium stores a program, and the program executes some or all of the steps recorded in the foregoing method embodiments.

The following describes another controller provided in an embodiment of the present invention. Referring to FIG. 9, the controller 900 includes: a receiver 901, a transmitter 902, a processor 903, and a memory 904 (there may be one or more processors 903 in the controller 900, and one processor is used as an example in FIG. 9). In some embodiments of the present invention, the receiver 901, the transmitter 902, the processor 903, and the memory 904 may be connected by using a bus or in another manner. In FIG. 9, a bus connection is used as an example.

The memory 904 may include a read-only memory and a random access memory, and provides an instruction and data for the processor 903. A part of the memory 904 may further include a non-volatile random access memory (NVRAM). The memory 904 stores an operating system, and an operating instruction, an executable module or a data structure, or a subset of the operating instruction, the executable module or the data structure, or an extended set of the operating instruction, the executable module, or the data structure. The operating instruction may include various operating instructions and is configured to implement various operations. The operating system may include various system programs, and is configured to: implement various basic services, and process hardware-based tasks.

The processor 903 controls an operation of the controller. The processor 903 may also be referred to as a central processing unit (CPU). In a specific application, all components of the controller are coupled together by using a bus system. In addition to a data bus, the bus system may further include a power bus, a control bus, a status signal bus, and the like. However, for clear description, all kinds of buses are marked as the bus system in the figure.

The method disclosed in the foregoing embodiment of the present invention may be applied to the processor 903, or implemented by the processor 903. The processor 903 may be an integrated circuit chip with a signal processing capability. In an implementation process, the steps of the method may be implemented by an integrated logical circuit of hardware in the processor 903, or by a software instruction. The processor 903 may be a general purpose processor, a digital signal processor (DSP), an application-specific integrated circuit (ASIC), a field programmable gate array (FPGA) or another programmable logic device, a discrete gate or a transistor logic device, or a discrete hardware assembly. The processor 903 may implement or execute the methods, steps and logical block diagrams that are disclosed in the embodiments of the present invention. The general purpose processor may be a microprocessor, or the processor may be any conventional processor or the like. The steps of the methods disclosed with reference to the embodiments of the present invention may be directly performed by a hardware decoding processor, or may be performed by a combination of hardware and a software module in a decoding processor. The software module may be located in a random access memory, a flash memory, a read-only memory, a programmable read-only memory or an erasable programmable memory, a register, or another mature storage medium in the art. The storage medium is located in the memory 904, and the processor 903 reads information in the memory 904 and implements, the steps of the foregoing methods in combination with hardware of the processor.

The receiver 901 may be configured to: receive digital or character information that is input, and generate signal input related to user setting and function control of the controller. The transmitter 902 may include a display device such as a display screen. The transmitter 902 may be configured to output digital or character information over an external interface.

In this embodiment of the present invention, the processor 903 is configured to execute the terminal handover method executed by the controller. For details, refer to the descriptions in the foregoing embodiments. In detail, the processor 903 is configured to perform the following steps: sending a radio identifier and a control channel resource of a terminal that are configured by the controller to the terminal; when the terminal is located in a coverage area of a first base station, sending the radio identifier and the control channel resource of the terminal to the first base station; and determining that the terminal is located in a coverage area of a second base station, and sending, the radio identifier and the control channel resource of the terminal to the second base station, so that control signalling sent from the first base station and the second base station separately is received by the terminal by using the control channel resource.

In this embodiment of the present invention, the controller allocates, to the terminal, the terminal identifier and the control channel resource that can be used by the terminal in both the first base station and the second base station to which the terminal is handed over; when the terminal is located in the coverage area of the first base station, the controller also sends the radio identifier and the control channel resource that are configured for the terminal to the first base station, the controller determines that the terminal is located in the coverage area of the second base station, and the controller also sends the radio identifier and the control channel resource that are configured for the terminal to the second base station. Therefore, when the terminal moves between base stations such as the first base station and the second base station, the terminal can always use the radio identifier and the control channel resource that are configured by the controller, and re-configuration is not required. In this way, re-configuration signaling can be saved, data transmission is not interrupted when the terminal is handed over from the first base station to the second base station, and data transmission efficiency is quite high.

In some embodiments of the present invention, the processor 903 is specifically configured to perform the following: sending the radio identifier and the control channel resource of the terminal to a base station initially accessed by the terminal, so that the initially accessed base station sends the radio identifier and the control channel resource of the terminal to the terminal.

In this embodiment of the present invention, the base station initially accessed by the terminal may forward the radio identifier and the control channel resource of the terminal to the terminal, and the terminal obtains the radio identifier and the control channel resource of the terminal from the initially accessed base station. When the terminal moves between base stations such as the first base station and the second base station, the terminal can always use the radio identifier and the control channel resource that are configured by the controller, and re-configuration is not required. This can save re-configuration signalling.

In some embodiments of the present invention, the processor 903 is specifically configured to perform the following: receiving a measurement report that comes from the terminal and that is forwarded by a base station, where the measurement report that comes from the terminal is sent by the terminal when the terminal performs channel measurement according to measurement configuration information provided by the controller and the terminal determines that a radio signal measurement quantity between the second base station and the terminal meets a pre-set first channel condition; and determining, according to the measurement report sent by the terminal, that the terminal is located in the coverage area of the second base station; or receiving a first measurement report sent by the base station, where the first measurement report sent by the base station is sent when the base station determines, according to a measurement result sent by the terminal, that a radio signal measurement quantity between the base station and the terminal meets a pre-set second channel condition, and the measurement result sent by the terminal is generated after the terminal performs channel measurement according to measurement configuration information provided by the controller; and determining, according to the measurement report sent by the base station, that the terminal is located in the coverage area of the second base station; or receiving a measurement result sent by the base station, where the measurement result sent by the base station is generated after the base station performs channel measurement on a position tracking signal sent by the terminal; determining, according to the measurement result sent by the base station, that a radio signal measurement quantity between the second base station and the terminal meets a pre-set third channel condition; and determining that the terminal is located in the coverage area of the second base station; or receiving a second measurement report sent by the base station, where the second measurement report sent by the base station is sent when the base station performs channel measurement on a position tracking signal sent by the terminal and determines that a radio channel measurement quantity between the base station and the terminal meets a pre-set fourth channel condition; and determining, according to the measurement report sent by the base station, that the terminal is located in the coverage area of the second base station.

The base station is the first base station and/or the second base station.

In this embodiment of the present invention, the controller may use multiple feasible manners to determine that the terminal is located in the coverage area of the second base station. In the foregoing feasible manners, the terminal may send the measurement report generated by the terminal to the controller by way of the base station, or the base station may send the measurement report generated by the base station to the controller, and the controller determines, according to the measurement report, that the terminal is located in the coverage area of the second base station; or the controller may determine by itself that the terminal is located in the coverage area of the second base station.

In some embodiments of the present invention, the processor 903 is further configured to perform the following: receiving data transmission status information sent by a gateway, where the data transmission status information includes at least one piece of the following information: a status of data transmission between the gateway and the first base station or a status of data transmission between the gateway and the second base station; and when the controller determines that the status of data transmission between the gateway and the first base station does not meet a pre-set transmission condition, sending a teardown instruction to the gateway or the first base station, so that the gateway or the first base station tears down a transmission path between the gateway and the first base station.

In this embodiment of the present invention, the controller sends the path teardown instruction to the gateway or the first base station, so that the gateway or the first base station tears down the transmission path between the gateway and the first base station. Data transmission efficiency can be improved by tearing down the idle transmission path.

In some embodiments of the present invention, a control function of the controller is implemented by the first base station; or when the terminal is located in the coverage area of the first base station, a control function of the controller is implemented by the first base station, and when the terminal is located in the coverage area of the second base station, a control function of the controller is implemented by the second base station.

In this embodiment of the present invention, the controller may be implemented in multiple manners. The controller may be implemented by the first base station. The controller may alternatively be implemented in a distributed manner: As the terminal moves continually, the control function of the controller may be implemented by the first base station or the second base station. In this way, the controller is deployed quite flexibly.

Figure 10:
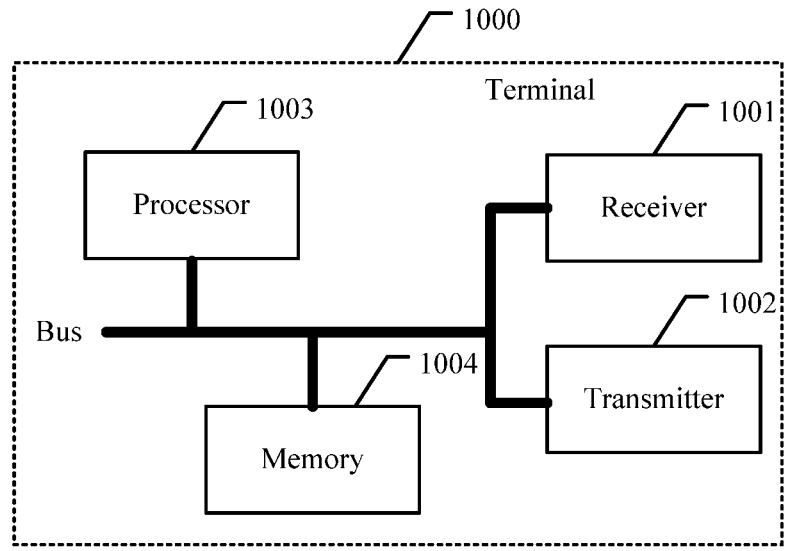
FIG. 10 is a schematic structural diagram of composition of another terminal according to an embodiment of the present invention.

The following describes another terminal provided in an embodiment of the present invention. Referring to FIG. 10, the terminal 1000 includes: a receiver 1001, a transmitter 1002, a processor 1003, and a memory 1004 (there may be one or more processors 1003 in the terminal 1000, and one processor is used as an example in FIG. 10). In some embodiments of the present invention, the receiver 1001, the transmitter 1002, the processor 1003, and the memory 1004 may be connected by using a bus or in another manner. In FIG. 10, a bus connection is used as an example.

The memory 1004 may include a read-only memory and a random access memory, and provides an instruction and data for the processor 1003. A part of the memory 1004 may further include an NVRAM. The memory 1004 stores an operating system, and an operating instruction, an executable module or a data structure, or a subset of the operating instruction, the executable module or the data structure, or an extended set of the operating instruction, the executable module, or the data structure. The operating instruction may include various operating instructions and is configured to implement various operations. The operating system may include various system programs, and is configured to: implement various basic services, and process hardware-based tasks.

The processor 1003 controls an operation of the terminal. The processor 1003 may be further referred to as a CPU. In a specific application, all components of the terminal are coupled together by using a bus system. In addition to a data bus, the bus system may further include a power bus, a control bus, a status signal bus, and the like. However, for clear description, all kinds of buses are marked as the bus system in the figure.

The method disclosed in the foregoing embodiment of the present invention may be applied to the processor 1003, or implemented by the processor 1003. The processor 1003 may be an integrated circuit chip with a signal processing capability. In an implementation process, the steps of the method may be implemented by an integrated logical circuit of hardware in the processor 1003, or by a software instruction. The processor 1003 may be a general purpose processor, a DSP, an ASIC, an FPGA or another programmable logic device, a discrete gate or transistor logic device, or a discrete hardware assembly. The processor 1003 may implement or execute the methods, steps and logical block diagrams that are disclosed in the embodiments of the present invention. The general purpose processor may be a microprocessor, or the processor may be any conventional processor or the like. The steps of the methods disclosed with reference to the embodiments of the present invention may be directly performed by a hardware decoding processor, or may be performed by a combination of hardware and a software module in a decoding processor. The software module may be located in a random access memory, a flash memory, a read-only memory, a programmable read-only memory or an erasable programmable memory, a register, or another mature storage medium in the art. The storage medium is located in the memory 1004, and the processor 1003 reads information in the memory 1004 and implements, the steps of the foregoing methods in combination with hardware of the processor.

In this embodiment of the present invention, the processor 1003 is configured to execute the terminal handover method executed by the terminal in the foregoing embodiments. The processor 1003 is configured to perform the following: receiving, from a controller, a radio identifier of a terminal and a control channel resource configured by the controller; receiving, according to the control channel resource, control signaling sent by a base station, where the base station is a first base station and/or a second base station; and transmitting data on a shared channel according to the control signaling, where the shared channel is a transmission channel configured between the base station and the terminal.

In this embodiment of the present invention, the controller allocates, to the terminal, the terminal identifier and the control channel resource that can be used by the terminal in both the first base station and the second base station to which the terminal is handed over; when the terminal is located in the coverage area of the first base station, the controller also sends the radio identifier and the control channel resource that are configured for the terminal to the first base station, the controller determines that the terminal is located in the coverage area of the second base station, and the controller also sends the radio identifier and the control channel resource that are configured for the terminal to the second base station. Therefore, when the terminal moves between base stations such as the first base station and the second base station, the terminal can always use the radio identifier and the control channel resource that are configured by the controller, and re-configuration is not required. In this way, re-configuration signaling can be saved, data transmission is not interrupted when the terminal is handed over from the first base station to the second base station, and data transmission efficiency is quite high.

In some embodiments of the present invention, the processor 1003 is further configured to perform the following steps: performing channel measurement according to measurement configuration information provided by the controller, determining, according to a generated measurement result, whether a radio signal measurement quantity between the second base station and the terminal meets a pre-set first channel condition, and when the radio signal measurement quantity between the second base station and the terminal meets the pre-set first channel condition, sending a measurement report to the controller by way of the base station; or performing channel measurement according to measurement configuration information provided by the controller, and sending a measurement result generated by the terminal to the base station; or sending a position tracking signal according to signal configuration information provided by the controller.

In this embodiment of the present invention, the controller may use multiple feasible manners to determine that the terminal is located in the coverage area of the second base station. In the foregoing feasible manners, the terminal may send the measurement report generated by the terminal to the controller by way of the base station, or the base station may send the measurement report generated by the base station to the controller, and the controller determines, according to the measurement report, that the terminal is located in the coverage area of the second base station; or the controller may determine by itself that the terminal is located in the coverage area of the second base station.

In some embodiments of the present invention, the processor 1003 is specifically configured to perform the following: receiving, on the shared channel, downlink data sent by the first base station and/or the second base station; and/or sending, uplink data to the first base station and/or the second base station on the shared channel.

In this embodiment of the present invention, the terminal may perform data transmission with both the first base station and the second base station, and this data transmission may be uplink transmission or downlink transmission. This can improve data transmission efficiency.

In some embodiments of the present invention, a control function of the controller is implemented by the first base station; or when the terminal is located in a coverage area of the first base station, a control function of the controller is implemented by the first base station, and when the terminal is located in a coverage area of the second base station, a control function of the controller is implemented by the second base station.

In this embodiment of the present invention, the controller may be implemented in multiple manners. The controller may be implemented by the first base station. The controller may alternatively be implemented in a distributed manner: As the terminal moves continually, the control function of the controller may be implemented by the first base station or the second base station. In this way, the controller is deployed quite flexibly.

Figure 11:
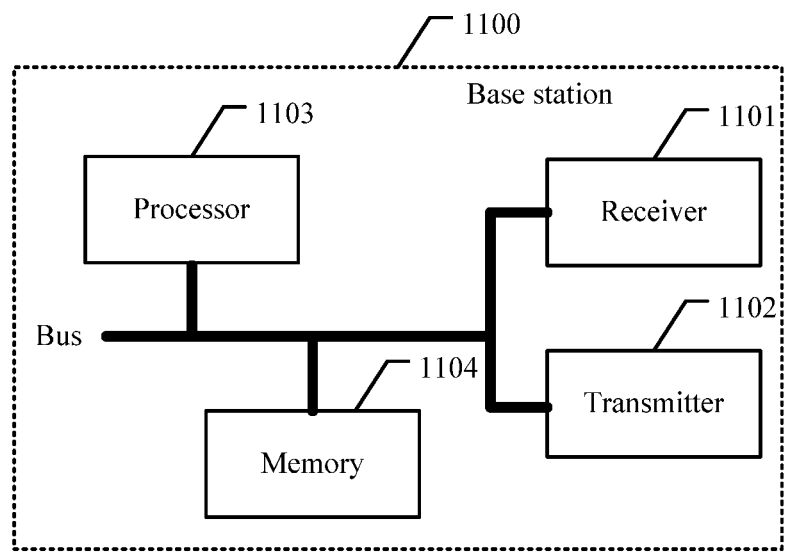
FIG. 11 is a schematic structural diagram of composition of another base station according to an embodiment of the present invention.

The following describes another base station provided in an embodiment of the present invention. Referring to FIG. 11, the base station 1100 includes: a receiver 1101, a transmitter 1102, a processor 1103, and a memory 1104 (there may be one or more processors 1103 in the base station 1100, and one processor is used as an example in FIG. 11). In some embodiments of the present invention, the receiver 1101, the transmitter 1102, the processor 1103, and the memory 1104 may be connected by using a bus or in another manner. In FIG. 11, a bus connection is used as an example.

The memory 1104 may include a read-only memory and a random access memory, and provides an instruction and data for the processor 1103. A part of the memory 1104 may further include an NVRAM. The memory 1104 stores an operating system, and an operating instruction, an executable module or a data structure, or a subset of the operating instruction, the executable module or the data structure, or an extended set of the operating instruction, the executable module, or the data structure. The operating instruction may include various operating instructions and is configured to implement various operations. The operating system may include various system programs, and is configured to: implement various basic services, and process hardware-based tasks.

The processor 1103 controls an operation of the base station. The processor 1103 may be further referred to as a CPU. In a specific application, all components of the base station are coupled together by using a bus system. In addition to a data bus, the bus system may further include a power bus, a control bus, a status signal bus, and the like. However, for clear description, all kinds of buses are marked as the bus system in the figure.

The method disclosed in the foregoing embodiment of the present invention may be applied to the processor 1103, or implemented by the processor 1103. The processor 1103 may be an integrated circuit chip with a signal processing capability. In an implementation process, the steps of the method may be implemented by an integrated logical circuit of hardware in the processor 1103, or by a software instruction. The processor 1103 may be a general purpose processor, a DSP, an ASIC, an FPGA or another programmable logic device, a discrete gate or transistor logic device, or a discrete hardware assembly. The processor 1103 may implement or execute the methods, steps and logical block diagrams that are disclosed in the embodiments of the present invention. The general purpose processor may be a microprocessor, or the processor may be any conventional processor or the like. The steps of the methods disclosed with reference to the embodiments of the present invention may be directly performed by a hardware decoding processor, or may be performed by a combination of hardware and a software module in a decoding processor. The software module may be located in a random access memory, a flash memory, a read-only memory, a programmable read-only memory or an erasable programmable memory, a register, or another mature storage medium in the art. The storage medium is located in the memory 1104, and the processor 1103 reads information in the memory 1104 and implements, the steps of the foregoing methods in combination with hardware of the processor.

In this embodiment of the present invention, the processor 1103 is configured to execute the terminal handover method executed by the base station in the foregoing embodiments. Specifically, the processor 1103 is configured to perform the following: receiving, from a controller, a radio identifier of a terminal and a control channel resource configured by the controller, where the base station is a first base station and/or a second base station; sending control signaling to the terminal by using the control channel resource; and transmitting data on a shared channel between the base station and the terminal.

In this embodiment of the present invention, the controller allocates, to the terminal, the terminal identifier and the control channel resource that can be used by the terminal in both the first base station and the second base station to which the terminal is handed over; when the terminal is located in the coverage area of the first base station, the controller also sends the radio identifier and the control channel resource that are configured for the terminal to the first base station, the controller determines that the terminal is located in the coverage area of the second base station, and the controller also sends the radio identifier and the control channel resource that are configured for the terminal to the second base station. Therefore, when the terminal moves between base stations such as the first base station and the second base station, the terminal can always use the radio identifier and the control channel resource that are configured by the controller, and re-configuration is not required. In this way, re-configuration signaling can be saved, data transmission is not interrupted when the terminal is handed over from the first base station to the second base station, and data transmission efficiency is quite high.

In some embodiments of the present invention, the processor 1103 is further configured to perform the following: receiving a measurement report sent by the terminal, where the measurement report sent by the terminal is sent by the terminal when the terminal performs channel measurement according to measurement configuration information provided by the controller and determines that a radio signal measurement quantity between the second base station and the terminal meets a pre-set first channel condition; and forwarding, to the controller, the measurement report sent by the terminal; or receiving a measurement result sent by the terminal, where the measurement result sent by the terminal is generated after the terminal performs channel measurement according to measurement configuration information provided by the controller; and sending a measurement report to the controller when determining, according to the measurement result, that a radio signal measurement quantity between the base station and the terminal meets a pre-set second channel condition; or generating a measurement result after performing channel measurement on a position tracking signal sent by the terminal, and sending the measurement result generated by the base station to the controller; or performing channel measurement on a position tracking signal sent by the terminal, and sending a measurement report generated by the base station to the controller when determining that a radio channel measurement quantity between the base station and the terminal meets a pre-set fourth channel condition.

In this embodiment of the present invention, the controller may use multiple feasible manners to determine that the terminal is located in the coverage area of the second base station. In the foregoing feasible manners, the terminal may send the measurement report generated by the terminal to the controller by way of the base station, or the base station may send the measurement report generated by the base station to the controller, and the controller determines, according to the measurement report, that the terminal is located in the coverage area of the second base station; or the controller may determine by itself that the terminal is located in the coverage area of the second base station.

In some embodiments of the present invention, the processor 1103 is further configured to perform the following: when the base station is the first base station, implementing, by the first base station, a control function of the controller; or when the terminal is located in a coverage area of the first base station, implementing, by the first base station, a control function of the controller, and when the terminal is located in a coverage area of the second base station, sending, by the first base station, a control function move instruction to the second base station, where the control function move instruction includes configuration context of the terminal.

In this embodiment of the present invention, the controller may be implemented in multiple manners. The controller may be implemented by the first base station. The controller may alternatively be implemented in a distributed manner: As the terminal moves continually, the control function of the controller may be implemented by the first base station or the second base station. In this way, the controller is deployed quite flexibly.

Figure 12:
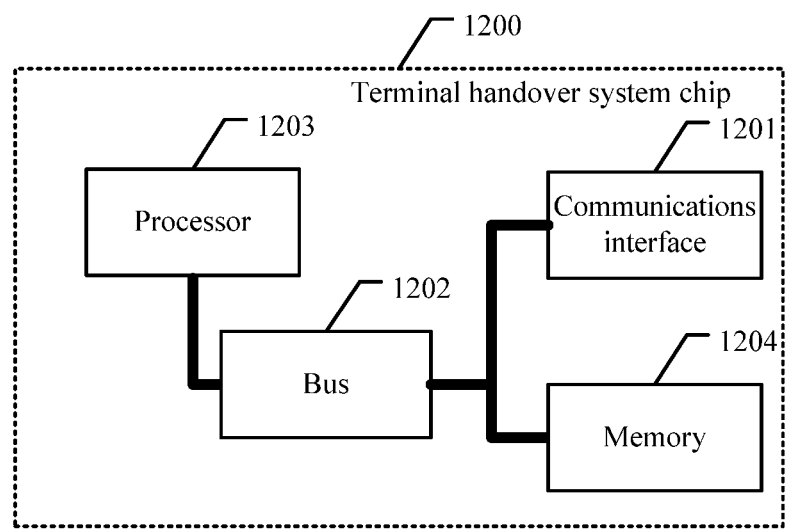
FIG. 12 is a schematic structural diagram of composition of another controller according to an embodiment of the present invention.

Referring to FIG. 12, an embodiment of the present invention further provides a terminal handover system chip 1200, including a communications interface 1201, a bus 1202, a processor 1203, and a memory 1204. The chip 1200 interacts with an external device by using the communications interface 1201, the communications interface 1201 communicates with the processor 1203 and the memory 1204 by using the bus 1202, and the memory 1204 stores source program code required for the terminal handover method.

The processor 1203 is configured to: invoke the code stored by the memory 1204, and execute the terminal handover method executed by the controller. For details, refer to the descriptions in the foregoing embodiments.

Figure 13:
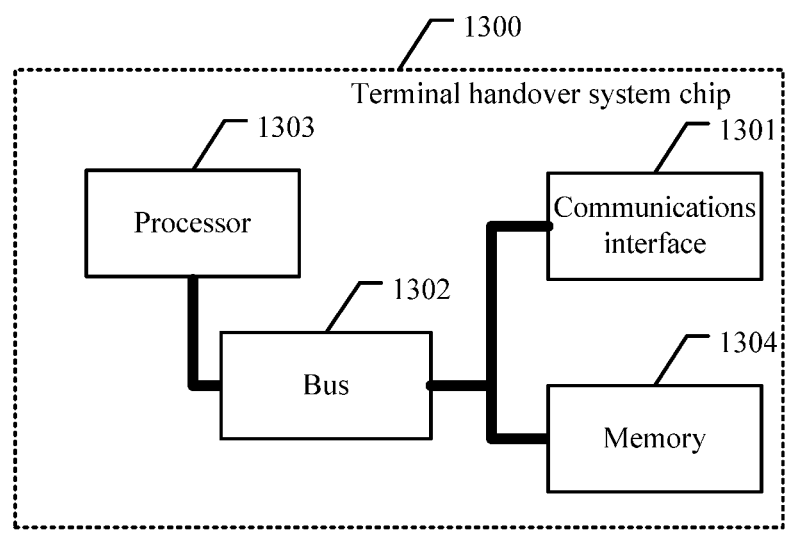
FIG. 13 is a schematic structural diagram of composition of another terminal according to an embodiment of the present invention.

Referring to FIG. 13, an embodiment of the present invention further provides a terminal handover system chip 1300, including a communications interface 1301, a bus 1302, a processor 1303, and a memory 1304. The chip 1300 interacts with an external device by using the communications interface 1301, the communications interface 1301 communicates with the processor 1303 and the memory 1304 by using the bus 1302, and the memory 1304 stores source program code required for the terminal handover method.

The processor 1303 is configured to: invoke the code stored by the memory 1304, and execute the terminal handover method executed by the terminal. For details, refer to the descriptions in the foregoing embodiments.

Figure 14:
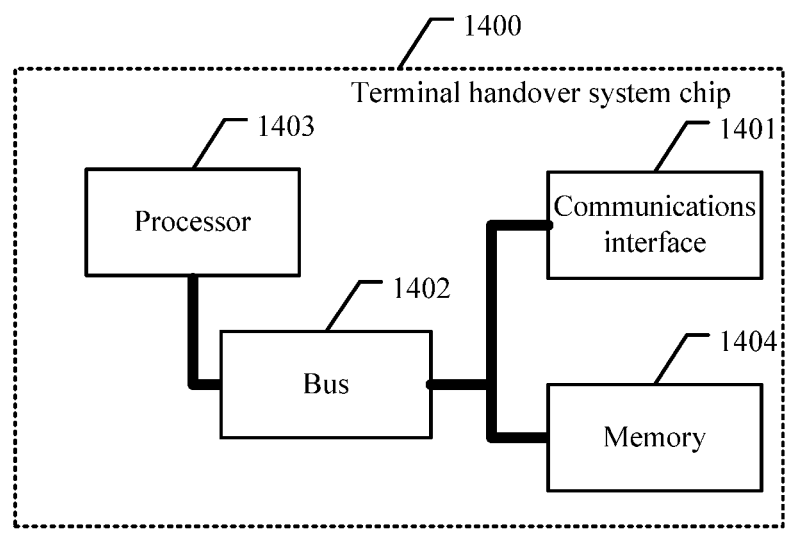
FIG. 14 is a schematic structural diagram of composition of another base station according to an embodiment of the present invention.

Referring to FIG. 14, an embodiment of the present invention further provides a terminal handover system chip 1400, including a communications interface 1401, a bus 1402, a processor 1403, and a memory 1404. The chip 1400 interacts with an external device by using the communications interface 1401, the communications interface 1401 communicates with the processor 1403 and the memory 1404 by using the bus 1402, and the memory 1404 stores source program code required for the terminal handover method.

The processor 1403 is configured to: invoke the code stored by the memory 1404, and execute the terminal handover method executed by the base station. For details, refer to the descriptions in the foregoing embodiments.

An embodiment of the present invention further provides a computer program, configured to execute the terminal handover method executed by the controller. For details, refer to the descriptions in the foregoing embodiments.

An embodiment of the present invention further provides a computer program, configured to execute the terminal handover method executed by the terminal. For details, refer to the descriptions in the foregoing embodiments.

An embodiment of the present invention further provides a computer program, configured to execute the terminal handover method executed by the base station. For details, refer to the descriptions in the foregoing embodiments.

Figure 15:
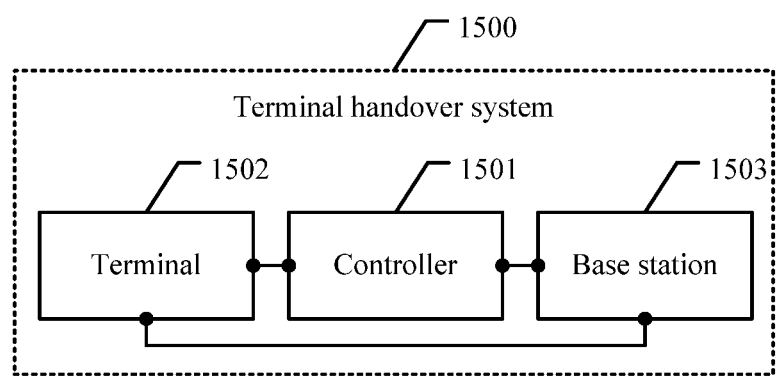
FIG. 15 is a schematic structural diagram of composition of a terminal handover system according to an embodiment of the present invention.

Referring to FIG. 15, an embodiment of the present invention further provides a terminal handover system 1500, including the controller 1501, the terminal 1502, and the base station 1503. The base station is a first base station and/or a second base station. In some embodiments of the present invention, the controller 1501 may be the controller shown in FIG. 6, the terminal 1502 may be the terminal 700 shown in FIG. 7-*a* or FIG. 7-*b*, and the base station 1503 may be the base station 800 shown in FIG. 8. In some embodiments of the present invention, the controller 1501 may be the controller 900 shown in FIG. 9, the terminal 1502 may be the terminal 1000 shown in FIG. 10, and the base station 1503 may be the base station 1100 shown in FIG. 11. For details, refer to the foregoing embodiments.

In addition, it should be noted that the described apparatus embodiments are merely exemplary. The units described as separate parts may or may not be physically separate. Parts displayed as units may or may not be physical units, and may be located in one position or distributed on a plurality of network units. Some or all the modules may be selected according to actual needs to achieve the objectives of the solutions of the embodiments. In addition, in the accompanying drawings of the apparatus embodiments provided by the present invention, connection relationships between modules indicate that the modules have communication connections with each other, which may be specifically implemented as one or more communications buses or signal cables. A person of ordinary skill in the art may understand and implement the embodiments of the present invention without creative efforts.

Based on the description of the foregoing implementations, a person skilled in the art may clearly understand that the present invention may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, or a dedicated circuit. However, for the present invention, an implementation using a software program is a more preferred implementation in most cases. Based on such an understanding, the technical solutions of the present invention essentially or the part contributing to the prior art may be implemented in a form of a software product. The software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, and the like) to perform the methods described in the embodiments of the present invention.

The foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method, comprising:
   determining, by a controller, that a terminal, which has been located in a coverage area of a first base station, moves into a coverage area of a second base station;
   sending, by the controller, to the second base station, a radio identifier of the terminal, and a control channel resource that is configured by the controller for the terminal, and that is used by the terminal to receive control signaling from the first base station, wherein the radio identifier and the control channel resource is received by the terminal from the first base station when the terminal initially accesses the first base station, and wherein the first base station receives the radio identifier and the control channel resource from the controller; and
   wherein the terminal can use the control channel resource to separately receive control signaling from the second base station and control signaling from the first base station.

2. The method according to claim 1, wherein determining, by the controller, that the terminal moves into the coverage area of the second base station comprises:
   receiving, by the controller, from a base station that is the first base station or the second base station, a measurement report that the terminal or the base station generates after determining that a radio signal measurement quantity meets a pre-set condition for a channel between the terminal and the base station, according to a measurement result of a channel measurement performed on the channel; and
   wherein the measurement report is generated by the terminal, the channel measurement is performed by the terminal, and the base station sends the measurement report to the controller after receiving the measurement report from the terminal.

3. The method according to claim 1, wherein determining, by the controller, that the terminal moves into the coverage area of the second base station comprises:
   receiving, by the controller, from a base station that is the first base station or the second base station, a measurement result of a channel measurement performed by the base station on a position tracking signal sent by the terminal, wherein the channel measurement is performed of a channel between the terminal and the base station; and
   determining, by the controller, that a radio signal measurement quantity meets a pre-set condition for the channel, according to the measurement result.

4. The method according to claim 1, comprising:
   receiving, by the controller, data transmission status information sent by a gateway, wherein the data transmission status information comprises a status of data transmission between the gateway and the first base station; and
   when the controller determines that the status of data transmission between the gateway and the first base station does not meet a pre-set transmission condition, sending, by the controller, a teardown instruction to the gateway or the first base station to tear down a transmission path between the gateway and the first base station.

5. The method according to claim 1, wherein the controller comprises a distributed controller that is deployed in the first base station and the second base station; and
   wherein, when the terminal is located in the coverage area of the first base station, a control function of the controller is implemented by the first base station, and when the terminal is located in the coverage area of the second base station, a control function of the controller is implemented by the second base station.

6. The method according to claim 1, wherein the controller is deployed in the first base station.

7. A method, comprising:
   receiving, by a second base station, from a controller, a radio identifier of a terminal and a control channel resource that is configured by the controller for the terminal to use to receive control signaling from a first base station, wherein the controller sends the radio identifier and the control channel resource to the second base station after the controller has determined that the terminal, which has been in a coverage area of the first base station, moves into a coverage area of the second base station, wherein the radio identifier and the control channel resource is received by the terminal from the first base station when the terminal initially accesses the first base station, and wherein the first base station receives the radio identifier and the control channel resource from the controller;
   sending, by the second base station, control signaling to the terminal by using the control channel resource received from the controller; and
   transmitting, by the second base station, data on a shared channel between the second base station and the terminal.

8. The method according to claim 7, wherein the method further comprises:
   receiving, by the second base station, a measurement report sent by the terminal, and forwarding the measurement report to the controller, wherein the measurement report sent by the terminal is sent by the terminal when the terminal performs channel measurement according to measurement configuration information provided by the controller and determines that a radio signal measurement quantity between the second base station and the terminal meets a pre-set first channel condition; or
   receiving, by the second base station, a measurement result sent by the terminal, and sending a measurement report to the controller when the second base station determines, according to the measurement result, that a radio signal measurement quantity between the second base station and the terminal meets a pre-set second channel condition, wherein the measurement result sent by the terminal is generated after the terminal performs channel measurement according to measurement configuration information provided by the controller.

9. The method according to claim 7, wherein the first base station implements a control function of the controller.

10. The method according to claim 7, wherein the first base station implements a control function of the controller when the terminal is located in the coverage area of the first base station; and
wherein the method further comprises receiving, by the second base station, a control function move instruction from the first base station when the terminal moves into the coverage area of the second base station, wherein the control function move instruction comprises configuration context of the terminal.

11. A controller, comprising:
a transceiver circuit;
a non-transitory memory storing a program; and
a processor, wherein the program comprises instructions that cause the processor to determine that a terminal, which has been located in a coverage area of a first base station, moves into a coverage area of a second base station;
wherein the transceiver circuit is configured to
send to the second base station, a radio identifier of the terminal and a control channel resource that is configured by the controller for the terminal, and that is used by the terminal to receive control signaling from the first base station, and
when the terminal initially accesses the first base station, send the radio identifier and the control channel resource to the first base station, wherein the first base station sends the radio identifier and the control channel resource to the terminal; and
wherein the terminal can use the control channel resource to separately receive control signaling from the second base station and control signaling from the first base station.

12. The controller according to claim 11, wherein the transceiver circuit is further configured to receive, from a base station that is the first base station or the second base station, a measurement report that the terminal or the base station generates after determining that a radio signal measurement quantity meets a pre-set condition for a channel between the terminal and the base station, according to a measurement result of a channel measurement performed on the channel;
wherein, when the measurement report is generated by the terminal, the channel measurement is performed by the terminal, and the base station sends the measurement report to the controller after receiving the measurement report from the terminal;
wherein, when the measurement report is generated by the base station, the base station obtains the measurement result by performing the channel measurement on a position tracking signal sent by the terminal, or by receiving the measurement result from the terminal after the terminal performs the channel measurement; and
wherein the program comprises further instructions that cause the processor to determine that the terminal moves into the coverage area of the second base station, according to the measurement report.

13. The controller according to claim 11, wherein the transceiver circuit is further configured to receive, from a base station that is the first base station or the second base station, a measurement result of a channel measurement performed by the base station on a position tracking signal sent by the terminal, wherein the channel measurement is performed of a channel between the terminal and the base station; and
wherein the program comprises further instructions that cause the processor to determine that the terminal moves into the coverage area of the second base station by determining that a radio signal measurement quantity meets a pre-set condition for the channel, according to the measurement result.

14. The controller according to claim 11, wherein the transceiver circuit is further configured to receive data transmission status information sent by a gateway, wherein the data transmission status information comprises a status of data transmission between the gateway and the first base station;
wherein the program comprises further instructions that cause the processor to determine when the status of data transmission between the gateway and the first base station does not meet a pre-set transmission condition; and
wherein, when it is determined that the status of data transmission between the gateway and the first base station does not meet the pre-set transmission condition, the transceiver circuit is further configured to send a teardown instruction to the gateway or the first base station to tear down a transmission path between the gateway and the first base station.

15. The controller according to claim 11, wherein a control function of the controller is implemented by the first base station.

16. The controller according to claim 11, wherein, when the terminal is located in the coverage area of the first base station, a control function of the controller is implemented by the first base station, and when the terminal is located in the coverage area of the second base station, a control function of the controller is implemented by the second base station.

17. A base station, comprising:
a first interface circuit; and
a second interface circuit;
wherein the first interface circuit is configured to:
receive, from a controller, a radio identifier of a terminal and a control channel resource configured by the controller for the terminal to use to receive control signaling from another base station, wherein the controller sends the radio identifier and the control channel resource to the base station after the controller has determined that the terminal, which has been in a coverage area of the other base station, moves into a coverage area of the base station, wherein the radio identifier and the control channel resource is received by the terminal from the other base station when the terminal initially accesses the other base station, and wherein the other base station receives the radio identifier and the control channel resource from the controller; and
send control signaling to the terminal by using the control channel resource; and
wherein the second interface circuit is configured to transmit data on a shared channel between the base station and the terminal.

18. The method according to claim 1, wherein determining, by the controller, that the terminal moves into the coverage area of the second base station comprises:
- receiving, by the controller, from a base station that is the first base station or the second base station, a measurement report that the terminal or the base station generates after determining that a radio signal measurement quantity meets a pre-set condition for a channel between the terminal and the base station, according to a measurement result of a channel measurement performed on the channel; and
- wherein the measurement report is generated by the base station, the base station obtains the measurement result by performing the channel measurement on a position tracking signal sent by the terminal, or by receiving the measurement result from the terminal after the terminal performs the channel measurement.

19. The method according to claim 7, wherein the method further comprises:
- generating, by the second base station, a measurement result after performing channel measurement on a position tracking signal sent by the terminal, and sending the measurement result generated by the second base station to the controller.

20. The method according to claim 7, wherein the method further comprises:
- performing, by the second base station, channel measurement on a position tracking signal sent by the terminal, and sending, by the second base station, a measurement report to the controller when the second base station determines that a radio channel measurement quantity between the second base station and the terminal meets a pre-set channel condition.

* * * * *